UNITED STATES PATENT OFFICE.

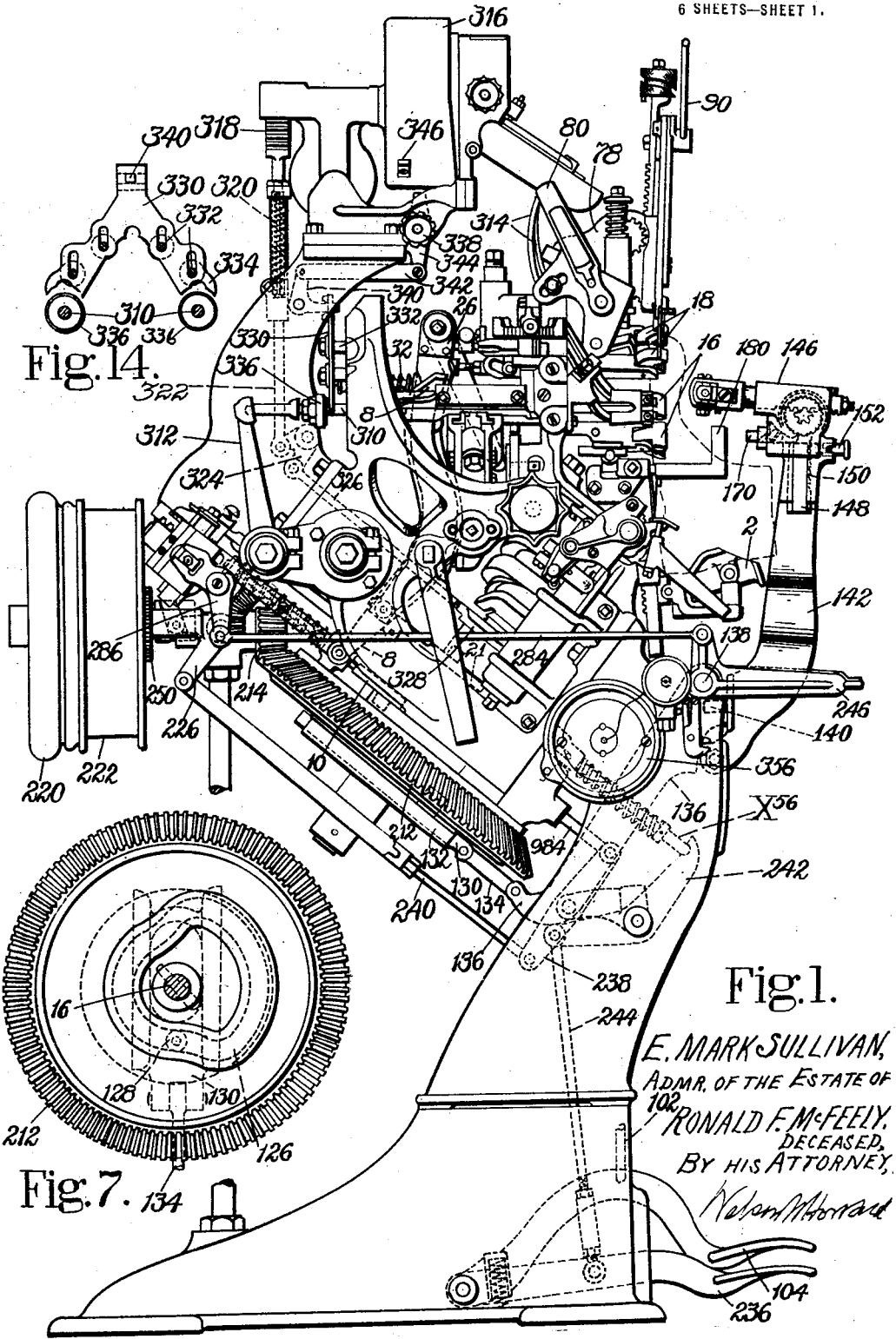

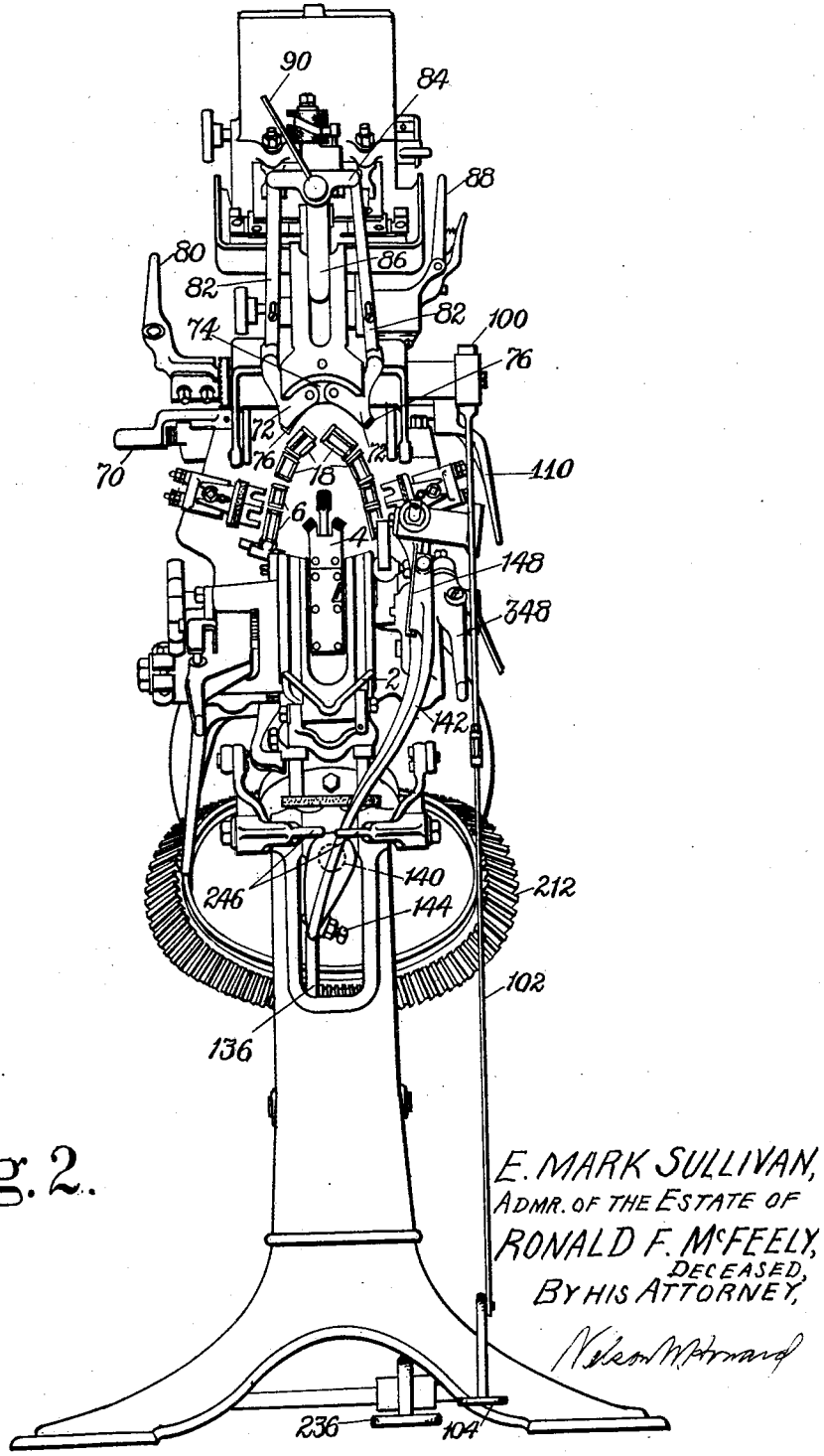

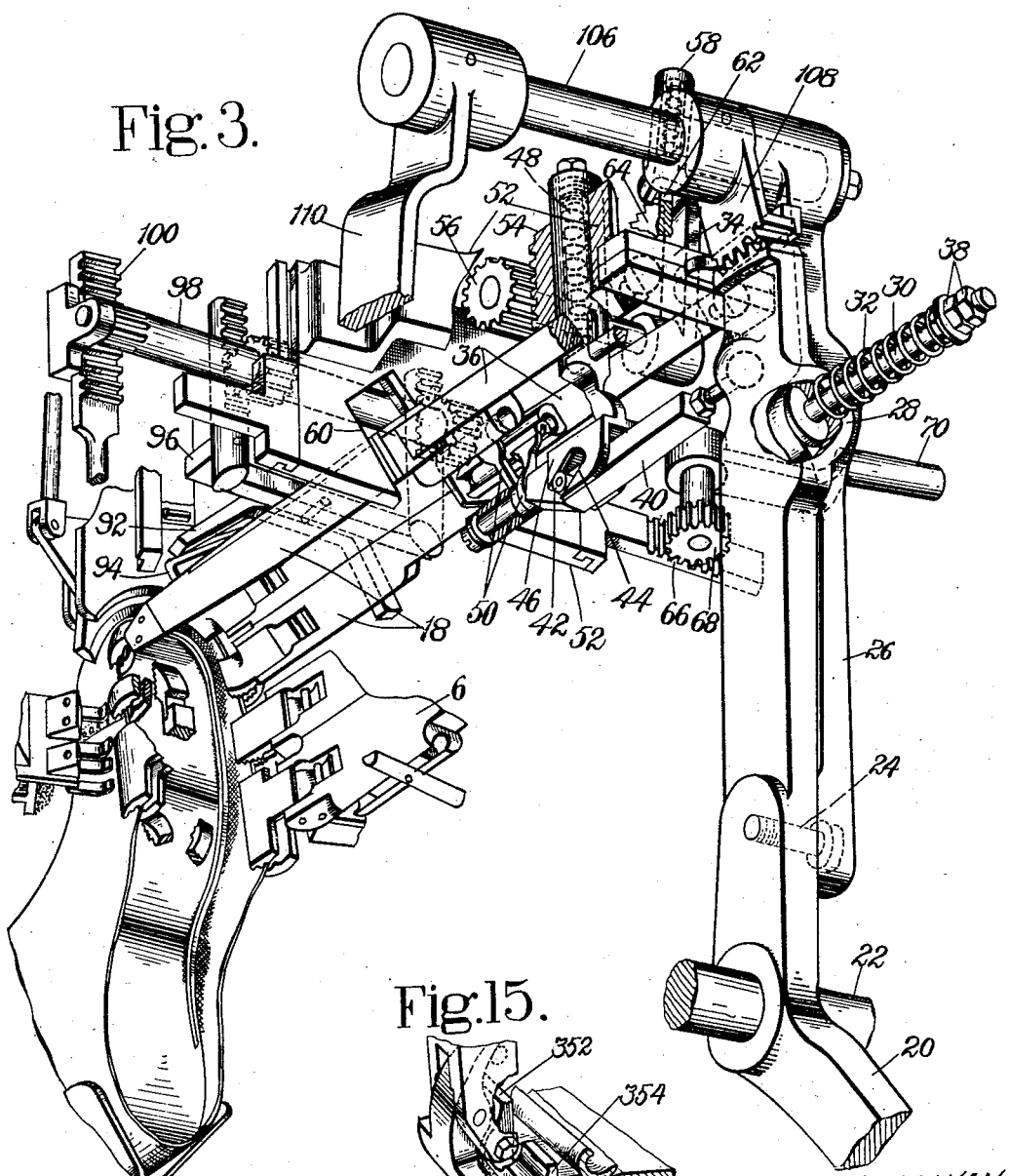

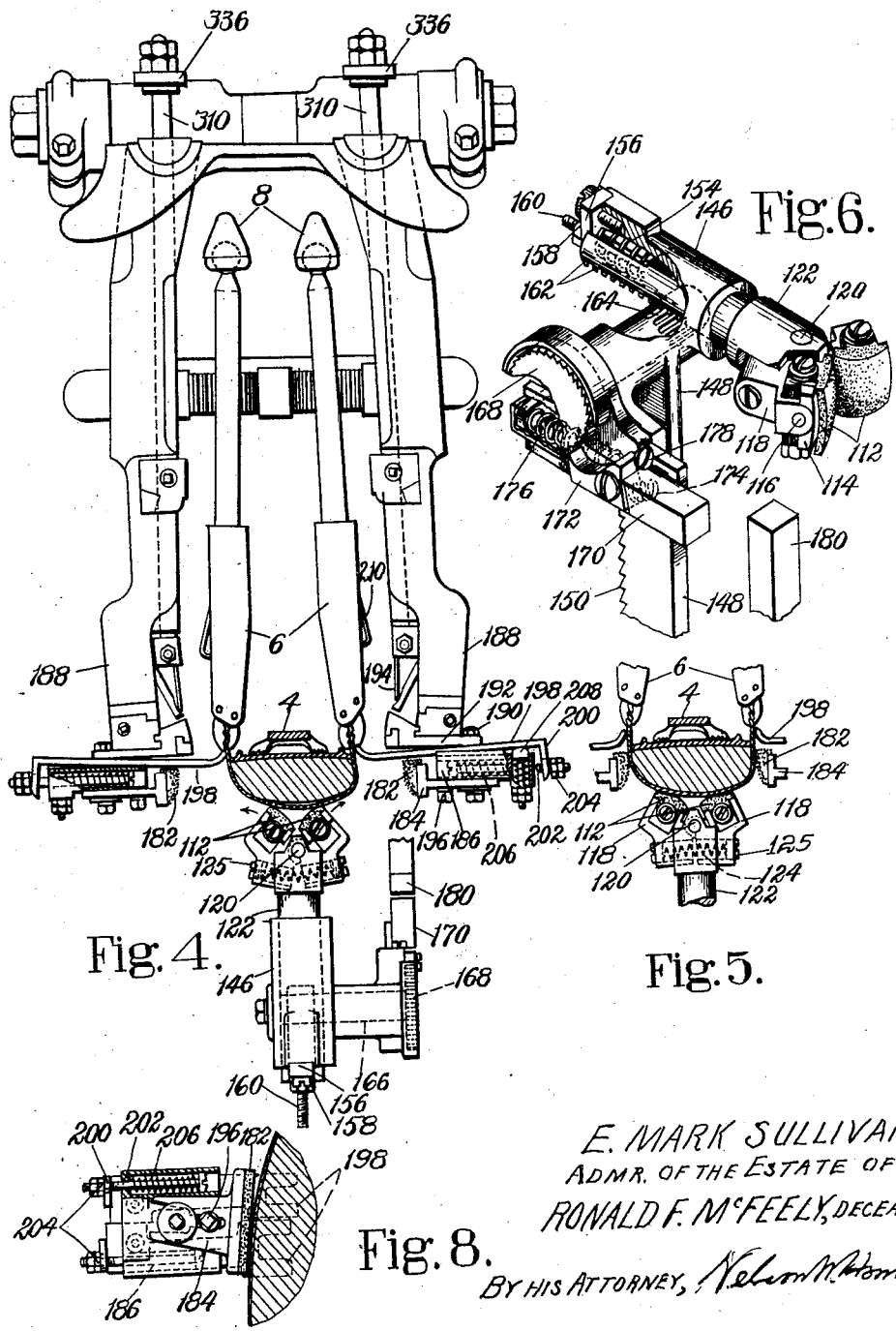

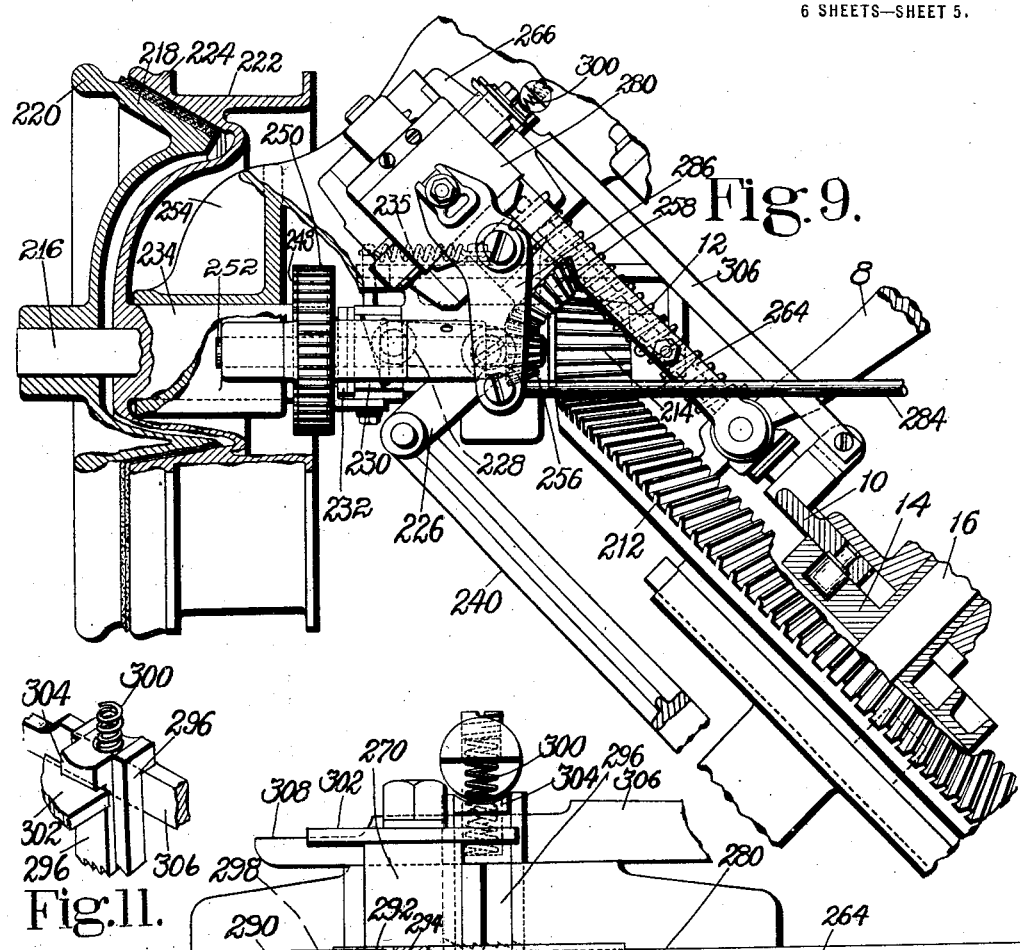
Fig. 9.
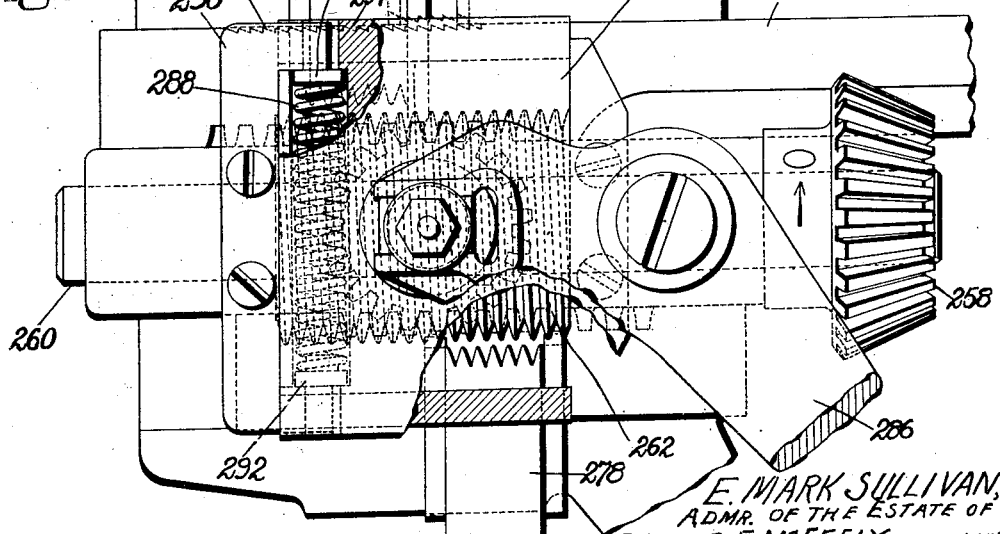
Fig. 11.
Fig. 10.

RONALD F. McFEELY, DECEASED, LATE OF BEVERLY, MASSACHUSETTS, BY E. MARK SULLIVAN, ADMINISTRATOR, OF BOSTON, MASSACHUSETTS, ASSIGNOR TO UNITED SHOE MACHINERY CORPORATION, OF PATERSON, NEW JERSEY, A CORPORATION OF NEW JERSEY.

MACHINE FOR SHAPING UPPERS TO LASTS.

1,409,190.         Specification of Letters Patent.     Patented Mar. 14, 1922.

Application filed January 14, 1918. Serial No. 211,849.

*To all whom it may concern:*

Be it known that RONALD F. MCFEELY, deceased, late of Beverly, in the county of Essex and State of Massachusetts, invented certain Improvements in Machines for Shaping Uppers to Lasts, of which the following description, in connection with the accompanying drawings, is a specification, like reference characters on the drawings indicating like parts in the several figures.

This invention relates to machines for shaping uppers to lasts, the invention being herein shown as embodied in a machine having means for pulling an upper over a last and also means for lasting the forepart of the shoe. It will be readily understood, however, from the following description of the construction and mode of operation of the illustrative machine and the explanation of the utility of the various features of the invention, that in many of its features the invention is not limited to a construction having means for performing both pulling-over and lasting operations.

An important object of the invention is to provide an improved power operated organization of the above mentioned class designed particularly to facilitate inspection and manipulation of the work and control of the operating instrumentalities during the operation of the machine. The machine shown has power operated upper pulling instrumentalities and operating mechanism therefor, together with means for positioning a last and an upper for a pulling-over operation, so constructed and arranged that the operations on the work are performed with the top of the forepart of the upper facing the operator and the toe end of the last pointing in a direction of non-intersection with the vertical front plane of the machine, i. e., a vertical plane extending at right angles to the sides of the machine between the last and the operator's working position, the work being positioned moreover, in such relation to the level of the operator's eyes as to permit him to view it easily and to manipulate it as required while maintaining a natural and easy attitude in front of the machine; and such parts of the machine as require manipulation and control are, moreover, positioned within easy reach of the operator in his working position. In the illustrative construction the shoe is positioned with its toe end pointing upward in a substantially vertical direction, but it will be evident that the invention, in its broader aspects, is not limited to an organization in which the shoe is positioned precisely in the location shown. The novel organization includes an improved construction and arrangement of operating mechanism for the various working instrumentalities, designed with a further view to simplicity in the arrangement of the various operating connections and with the object of providing a compact and durable structure. While this operating mechanism is shown herein in its relation to means for positioning the work in the manner above set forth, and while this combination and arrangement has numerous important advantages, it will be readily recognized that in some aspects the novel construction and arrangement of operating means presents advantages irrespective of the particular manner in which the work is positioned.

Another feature of the invention resides in novel means enabling the operator to control with great precision the operation of the upper pulling means, the construction shown comprising novel mechanism under the control of the operator for imparting a movement to one or both of the side grippers subsequent to an upper pulling movement of the grippers. This construction, in the illustrated embodiment of the invention, affords convenient means whereby the operator is enabled to render the machine effective either to increase or to relax the tension of the upper at one or both sides of the shoe, in the precise degree desired, or to adjust the forepart of the upper transversely of the last.

A further feature of the invention consists in a novel shoe rest mechanism, the machine herein shown having means for engaging the shoe at the top of the forepart so mounted and controlled as to facilitate presentation or removal of the work, as well as inspection of the pulled upper, and in the case of a pulling-over and lasting organization such as illustrated, to facilitate also securing the upper in lasted position. In the construction shown, moreover, the shoe rest comprises members for engaging the upper and stretching it laterally over the top of the forepart, and a further feature is to be recognized in a novel organization including means operative thus to stretch the upper.

Still other features of the invention will be recognized in novel means for use in manipulating the toe gripper of the machine, novel constructions of overlaying mechanism and tacker positioning mechanism, a novel tack saving device, a novel construction of side gripper, and in various other details of construction and combinations of parts, all of which will now be described with reference to the accompanying drawings and pointed out in the claims.

In the drawings,

Figure 1 is a view in side elevation of a machine in which the invention is embodied;

Fig. 2 is a view of the machine in front elevation;

Fig. 3 is a perspective view from the rear showing in detail the toe gripper mechanism with which the machine is provided;

Fig. 4 is a plan view partly in section, illustrating the relation of the shoe to the side gripping and tacking mechanisms and to the shoe supporting and stretching means;

Fig. 5 is a view similar to Fig. 4 showing a portion of the mechansim shown in said figure with the parts in a different relation to the shoe;

Fig. 6 is a detail perspective view of the shoe supporting and stretching means;

Fig. 7 is a detail view of the means for operating the mechanism shown in Fig. 6;

Fig. 8 is an inverted plan view of a portion of one of the side overlaying and tacking mchanisms, parts of the mechanism being shown in section;

Fig. 9 is a view similar to a portion of Fig. 1, with parts in section, illustrating in greater detail the power driving means;

Fig. 10 shows in greater detail than Figs. 1 and 9 a portion of the mechanism with which the machine is provided for effecting supplemental movements of the side grippers;

Fig. 11 is a detail view of a portion of the mechanism shown in Fig. 10;

Fig. 14 is a detail view of a portion of a tack saving device with which the machine is provided, and Fig. 15 is a perspective view showing a gripper of novel construction which may be used in the machine.

Figure 12:
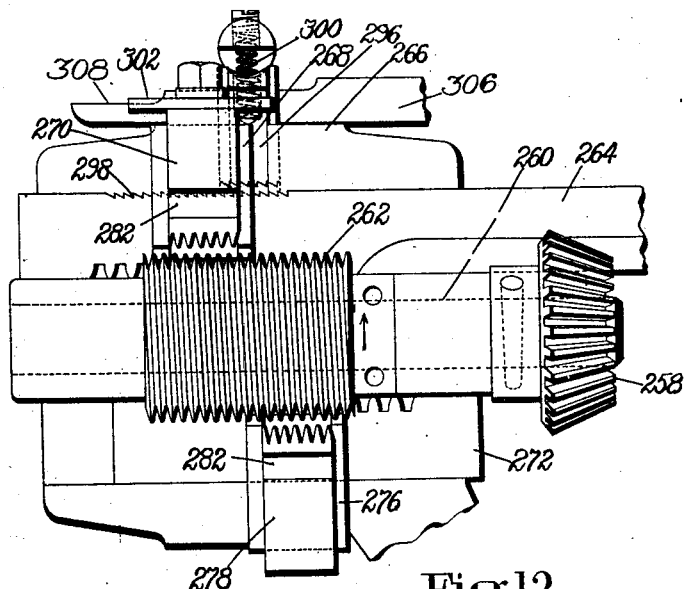
Fig. 12 is a view of the mechanism shown in Fig. 10, with portions of the structure removed.
Figure 13:
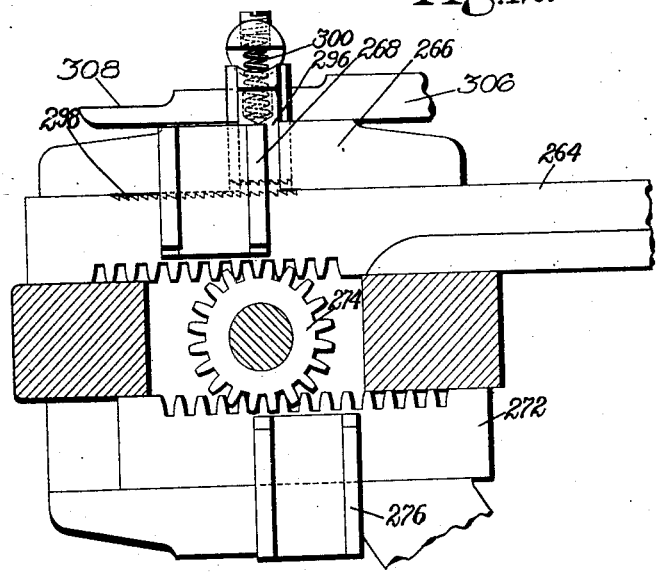
Fig. 13 is a vertical section through a portion of the mechanism shown in Fig. 12.

The invention is herein shown as embodied in a machine having numerous details of construction which are common to a well known type of pulling-over machine such as shown in various prior United States Letters Patent, and particularly in Patent No. 1,029,387, granted upon an earlier application of R. F. McFeely on June 11, 1912. The characteristics of the machine wherein the present invention is embodied, in so far as they differ from the well known construction, will be pointed out herein in detail, and for a more complete understanding of such features of the construction as are not herein specifically described, reference may be made to the earlier patent.

The machine herein shown is so organized as to operate upon a shoe in the position indicated by dotted lines in Fig. 1, in which the toe end of the shoe points upward in a substantially vertical direction with the forepart of the upper facing the operator and preferably somewhat below the level of the operator's eyes, thus presenting portions of the work which it is necessary for the operator to view critically in a position convenient for continuous observation during the operation of the machine without requiring the operator to assume any unnatural or strained position. The work positioning means comprises a heel rest 2 upon which the heel portion of the upper and last are supported, and a sole rest 4 for engaging the sole or innersole (hereinafter termed generically the "sole") at the forepart, the heel rest and the sole rest being constructed, operated and controlled substantially as in the machine shown and described in the prior patent above mentioned.

The machine is provided with side grippers 6 for engaging and pulling the upper at the sides of the shoe, each of these grippers being connected to an updraw lever 8 which is pivoted on the frame of the machine and is operated in the usual manner by means of a cam slide 10 through yieldable connections including a spring 12. The slide 10 is operated by means of a cam 14 on a cam shaft 16 which carries also a cam, not shown in detail, for operating other grippers 18 which are arranged to engage the toe portion of the upper. To pull the upper on the last a partial rotation is imparted to the cam shaft 16 by means which will be hereinafter described, after which the machine comes to rest with the upper under tension to permit the operator to inspect the work and to make whatever adjustments may be necessary in order to position the upper correctly upon the last or to vary the tension of different portions of the upper as may be desired.

The toe gripper mechanism in the machine herein shown, except as hereinafter pointed out, is substantially like that shown and described in prior United States Letters Patent No. 1,189,979, granted upon an earlier application of R. F. McFeely on July 4, 1916. This mechanism comprises two pairs of grippers 18 arranged as shown in Fig. 2 for engagement with the upper at the corners of the toe. The means for operating these grippers comprises a lever 20 which is fulcrumed at 22 and preferably has an unyielding operative connection with the cam shaft 16 through a cam slide 21. Pivotally mounted at 24 on the lever 20 is an arm 26 over which a portion 28 of the lever extends, the arm 26 carrying a rod 30 which projects through an opening in the portion 28 and is encircled by a spring 32 which tends normally to hold the arm 26 and the lever 20 in substantially parallel relation. Pivoted on the arm 26 is a cross head or equalizer lever 34 to the opposite ends of which are connected the operating bars 36 of the two pairs of grippers 18, the connection between the bars 36 and the lever 34 affording provision for turning movement of the two pairs of grippers in order to permit them to adapt their position to the shape of the last. The movement of the lever 20 thus serves to operate the toe grippers under yielding tension through the provision for relative movement of the lever and the arm 26 against the tension of the spring 32. The tension of this spring may be adjusted by nuts 38 on the rod 30.

From the front end of the unyieldingly operated lever 20 suspends a link 40 having roll studs 42 arranged to move lengthwise in inclined slots 44 of a bracket 46 which is normally stationary but is mounted for vertical adjustment and also for yielding downward movement against the tension of a stiff spring 48. The front end of the link 40 forms a pivot bearing for arms 50, the outer ends of which are mounted in guideways in the gripper bars 36. This connection between the lever 20 and the gripper bars causes the grippers to be forced obliquely outward from the corners of the last during the pulling movement imparted thereto by the arm 26. When a predetermined resistance to the outward pull of the grippers is encountered, the bracket 46 yields downwardly against the tension of the spring 48.

The bracket 46 is carried by a slide 52 upon which is formed a rack 54 engaged by a pinion 56 which is arranged to be operated by a hand lever 58 for the purpose of adjusting the bracket, either prior to the operation of the machine or after the grippers have pulled the upper, to vary the outdraw of the grippers, the slide 52 having diverging slots 60 in which the grippers are guided during the outdraw. A locking pawl 62 on the hand lever 58 is arranged to engage a toothed segment 64 to hold the lever in adjusted position. The slide 52 is also transversely adjustable to position the toe grippers for right and left lasts through the provision of a rack member 66 which is connected to the slide and engaged by a pinion 68 operated by a hand lever 70.

The machine herein shown is further provided with means for lasting the toe portion of the upper after the upper has been pulled by the grippers. This lasting means is constructed substantially as shown in prior United States Letters Patent No. 1,135,958, and comprises main wiper plates 72 and 74 and supplemental plates 76 (Fig. 2). The wiper plates are mounted on a head 78 (Fig. 1) which is movable by means of a lever 80 to carry the wipers in directions transverse to the plane of the sole for the purpose of producing an upwipe over the lateral surface of the last. The wiper plates 72 are connected by links 82 to an equalizing lever 84 which is mounted on a slide 86 to which the intermediate wiper plate 74 also is connected, and the slide 86 is operated by means of a hand lever 88 to close the wipers over the bottom of the shoe. The auxiliary wipers 76 are pivoted to the intermediate wiper plate 74 and are arranged to be operated through connections to a hand lever 90 to complete the lasting of the forepart, as fully described in prior Patent No. 1,135,958.

The wipers are operated manually to last the forepart of the shoe while the toe grippers hold the upper outspread and free from wrinkles about the entire toe portion of the last. The wipers are first moved forwardly from their idle position by means of the hand lever 80 and are then closed about the toe portion of the shoe by means of the lever 88. By the lever 80 they are then moved backwardly in engagement with the upper, while the upper is still held by the grippers, to wipe the upper free from wrinkles over the lateral surface of the last to the edge of the shoe bottom. The wipers are then operated by means of the lever 88 to lay the upper over the margin of the sole and to force it against the rib of the sole. As the wipers are thus closed over the shoe, the toe grippers are forced inward over the shoe and are finally tripped by manual means fully described in prior Patent No. 1,189,979. This means comprises a yoke 92 positioned above tripping devices 94 on the toe grippers, this yoke being pivoted on a slide 96 which has a rack and pinion connection with a shaft 98 engaged by a rack bar 100 which is connected by a link 102 to a treadle 104. This treadle is depressed by the operator during the operation of the lever 88 to close the grippers over the shoe, and by reason of the resistance of the latches 94 the yoke 92 is first effective to force the grippers inward over the shoe against the tension of the spring 48 before the grippers release the upper. This construction insures that the upper shall be held under tension until the wipers have obtained effective control of the stock. Further depression of the treadle 104 causes the yoke 92 to trip the latches 94 and thus free the upper from engagement with the grippers to permit the lasting operation to be completed by the main and auxiliary wipers in the manner fully described in the prior patent.

As distinguished from the construction shown in Patent No. 1,189,979, the machine is provided with means for rendering the toe grippers more fully subject to the operator's control for increasing or relaxing the tension of the upper at the toe in such manner as may be required by the peculiar conditions encountered in operating upon each particular shoe. To this end a rock shaft 106 is mounted on the outer end of the gripper operating arm 26 and carries a gear segment 108 in engagement with a similar segment on the front end of the main toe gripper lever 20. The shaft 106 is operated by means of a hand lever 110 secured on its outer end. This construction leaves the lever 20 and the arm 26 free for relative movement against the tension of the spring 32 during the operation of the grippers, but permits the operator, while the upper is under tension, to effect a movement of the arm 26 in either direction relatively to the stationary lever 20 for the purpose of increasing or relaxing the tension of the toe portion of the upper to such an extent as conditions may require.

In the machine herein shown the side clamp arms which are common to the type of machine illustrated in the prior patents to which reference has been made are dispensed with, and instead the machine is provided with means mounted on the side tacker arms for clamping the upper against the last at the sides of the shoe, as will be hereinafter described, and also with independently operated shoe engaging means arranged to press upon the upper at the top of the forepart to support the shoe and also to stretch the upper transversely. This shoe engaging means has broad features of novelty claimed in United States Letters Patent No. 1,249,185, granted on December 4, 1917, upon an application of Angelo Perri, and also numerous other features of improvement over the construction shown in said patent. The shoe engaging means comprises a pair of pads 112 secured to plates 114 which are pivoted at 116 on levers 118, these levers being mounted on a pivot 120 on a supporting stem 122. Between the tail ends of the two levers 118 is mounted a spring 124 which tends to swing the levers about their pivot 120 in such manner as to force the pads 112 toward each other, the parts being normally positioned as shown in Fig. 4 with the levers in engagement with an intermediate portion of the stem 122 which determines the limit of their movement toward each other. The pads 112 are arranged to engage the top of the forepart of the upper in locations close to the longitudinal median line of the shoe and at opposite sides of said line, and by pressure of the pads upon the shoe the levers 118 are swung about their pivot against the tension of the spring 124, carrying the pads in the directions indicated by the arrows in Fig. 4 to the positions in which they are shown in Fig. 5. In case the upper is bridged across the top of the last back of the toe, as shown in Fig. 4, the pads 112 serve to press the upper down into engagement with the last, and as they are swung apart they also act frictionally upon the upper to stretch the top portion outwardly toward the sides of the last, thus supplementing and assisting the action of the side grippers which preferably are holding the upper under tension at the time when the pressure of the pads is applied to the shoe. In this manner all portions of the forepart are uniformly stretched across the last and insurance is afforded that the upper shall conform accurately to the contour of the last. After the upper has been stretched in this manner the pads and their supporting means are maintained in position to support the shoe for the side overlaying and fastening operations and for the toe lasting operation.

The shoe support above described is moved toward and from the shoe by means of a cam 126 on the cam shaft 16, this cam engaging a roll 128 on a slide 130 which is mounted in a guide 132 and is connected by means of a link 134 to the lower end of an arm 136 pivoted on a rod 138 on the frame of the machine. On the arm 136 at right angles to the pivot rod 138 is a pivot 140 (Fig. 2) for an arm 142 which carries the shoe engaging and supporting members. The arms 136 and 142 are thus moved together about the pivot 138 to carry the pads 112 into or out of engagement with the shoe. The pivot 140 permits the arm 142 to be swung laterally relatively to the arm 136 in such manner as to present the shoe engaging members in an out of the way position, as shown in Fig. 2, to facilitate the operation of presenting a shoe to the machine or of removing it therefrom, or to present the shoe engaging members directly in front of the shoe in position to be moved into supporting relation to the shoe. An adjustable stop screw 144 on the lower end of the arm 142 is arranged to engage alternately opposite side portions of the frame to support the parts in idle position, as shown in Fig. 2, and to determine the correct relation of the members with respect to the opposite sides of the shoe when the arm is swung toward operative position.

The stem 122 which carries the pads 112 is mounted for sliding movement in directions toward or from the shoe in a bracket 146 which has a depending stem 148 mounted to slide up and down in a guideway in the arm 142. The stem 148 has ratchet teeth 150 arranged to be engaged by a spring held plunger 152 to support the bracket 146 in different adjusted positions relatively to the arm 142 in order to position the shoe engaging members at the desired distance from the toe ends of different shoes.

Mounted in a recess in the stem 122 is a spring 154 which bears against an abutment 156 and tends to move the stem forwardly toward the shoe. A nut 158 on a rod 160 which extends outwardly from the stem 122 serves by engagement with the abutment 156 to determine the normal forward limit of movement of the shoe engaging members. The abutment 156, moreover, engages in a slot in the stem 122 and prevents the stem from turning. On the lower side of the stem 122 are rack teeth 162 in engagement with gear teeth 164 formed on a shaft 166 which is mounted to turn in the bracket 146. The shaft 166 carries a ratchet wheel 168, and adjacent to this wheel is a slide 170 upon which is pivotally mounted a pawl 172. A spring 174 mounted in a socket in the slide 170 tends to swing the pawl in the direction to engage the ratchet wheel, but as the parts are normally positioned the slide 170 is forced backward by means of a spring 176 to a limit determined by the head of a screw 178 which is arranged to engage the tail end of the pawl 172 and also causes the pawl to be turned against the tension of its spring 174 to disengage it from the ratchet wheel. The slide 170 is operated to cause the pawl to engage and operate upon the ratchet wheel by means of a stop 180 which is adjustably mounted on the frame of the machine and is engaged by the end of the slide when the arm 142 is swung to carry the pads 112 into engagement with the shoe. When the shoe support, constructed as above described, is swung toward the shoe by the operation of the cam 126, the pads 112 by their pressure against the shoe are separated against the tension of their spring 124 in the manner hereinbefore described, and preferably before they have completed their spreading movement the spring 154 begins to yield, permitting the bracket 146 to move relatively to the stem 122. During this operation the increasing tension of the springs 124 and 154 causes the pads 112 to bear with increasing frictional pressure against the upper as they stretch it outwardly toward the sides of the shoe. Before the arm 142 has completed its movement the end of the slide 170 comes into engagement with the stop 180, and continued movement of the arm and the bracket 146 then causes the pawl 172 to engage the ratchet wheel 168 and to turn the wheel in the direction to force the stem 122 positively toward the shoe, the parts finally coming to rest with the shoe support locked in positive engagement with the shoe. This final positive movement of the stem 122 insures that the pads 112 shall be forced substantially to their outer limits of movement and that they shall bear with a firm supporting pressure against the shoe. Adjustment of the stop 180 in its holder serves to time the beginning of the operation of the pawl and thereby either to vary the positive pressure upon the shoe, or to permit uniform pressure to be applied to shoes of different sizes. Adjustment of the nut 158, as hereinbefore explained, varies the time of engagement of the pads with the shoe and also the tension of the spring 154. The force with which the pads 112 engage the stock before they begin to spread may, moreover, be determined by adjustment of the tension of the spring 124 by means of screws 125.

As hereinbefore explained, the machine is provided with means for engaging the upper at the sides of the last to assist in holding it in its tensioned condition until it has been secured to the sole. This means comprises pads 182 mounted on brackets 184 which are secured on the bottom of blocks 186 carried by the side tacker arms 188. The blocks 186 are secured by means of bolts 190 to tack carriers 192 which, together with the tack drivers 194, are swiveled on the tacker arms to turn about axes extending lengthwise of the arms substantially in the manner shown in prior Patent No. 1,029,387. The tacker arms are swung inwardly toward the shoe in the usual manner to carry the tacks and the drivers over the margin of the shoe bottom, and this movement of the arms is limited by engagement of the pads 182 with the sides of the shoe, such engagement determining the distance from the edge of the shoe at which the several tacks shall be driven. In order to vary this distance, the holder 184 is adjustable on the block 186, the holder being slotted, as shown in Fig. 8, and embracing a bolt 196 whereby it is secured in adjusted position. It will be understood that as the pad 182 engages the shoe it will cause the tack carrier and the drivers to swivel on the tacker arm and thus cause them to be positioned in accordance with the lengthwise contour of the particular portion of the shoe engaged by the pad. Since different shoes may vary as to the lengthwise contour of their lateral surfaces, the holder 184 is mounted with provision for adjustment angularly about the axis of the bolt 196, thus permitting the holder to be differently positioned as may be necessary for different styles of shoes, in order to insure that the tacks shall be driven at the same distance from the edge. It will be understood, moreover, that this construction permits such angular adjustment of the holder 184 relatively to the tack carrier as to cause different tacks to be driven at different distances from the edge of the shoe, if so desired.

In order to wipe the upper over the edge of the sole at the sides of the shoe preparatory to the driving of the tacks, the machine is provided with separate overlaying members or wiper plates 198 corresponding to different tacks to be driven, the machine herein shown having two of these plates on each tacker arm which are mounted side by side in guideways formed in the top of the supporting block 186 under the tack carrier 192. The plates are formed at their front ends to provide recesses for driving the tacks, as shown in Fig. 8, and at their outer ends are provided with slotted angular projections 200 embracing the stems of bolts 202 which are mounted in sockets in the block 186. Nuts 204 on the bolts engage the projections 200, and springs 206 mounted in the sockets in the block 186 tend to move the bolts in a direction to force the wiper plates inwardly toward the shoe in their overwiping plane. The recesses in which the plates 198 are mounted permit them to tip or rock on their support to some extent, as shown in Fig. 4, and spring plungers 208 mounted in the blocks 186 beneath the outer ends of the plates and relatively to which the plates are slidable substantially in their overwiping plane tend to upraise their outer end portions and to position the plates normally as shown in Fig. 4.

The side tacker arms 188 are swung inward toward the shoe in the usual way while the side grippers 6 are holding the upper under tension. As the arms 188 swing inward, the movement of the wiper plates 198 is retarded by the engagement of these plates with the tensioned upper, causing the springs 206 to be compressed as the tacker arms continue their movement. At about the time when the pads 182 engage the sides of the shoe the side grippers are tripped by engagement of the tacker arms with the usual tripping devices 210. As the grippers release the upper the compressed springs 206 become effective to force the wiper plates inward and cause them to wipe the upper over the margin of the sole into position for tacking. As the wipers are forced inward their forward end portions ride up over the shoe bottom, causing the wipers to be rocked in their holders against the resistance of the spring plungers 208. It will be evident that with this construction the springs 206 are directly effective, independently of the plungers 208, to press the wiper plates yieldingly against the upper and to force the plates over the shoe bottom immediately upon the release of the stock by the grippers, thus insuring, in co-operation with the presser pads 182, against any substantial relaxing of the tension of the upper at the sides of the shoe in the interval between the release of the stock by the grippers and the driving of the tacks. It will also be evident that the provision of independently operated wiper plates for engaging the upper in different locations lengthwise of the shoe insures that the tension of the different respective portions of the upper shall be retained irrespective of the lengthwise lateral contour of the shoe.

The cam shaft 16 for imparting operative movement to the upper pulling and fastening mechanisms extends upward substantially in front of the gripper operating levers and between these levers and the location of the shoe, the cam shaft in the construction shown being inclined upwardly and forwardly with respect to a horizontal plane, as shown in Figs. 1 and 9. On the lower end of the cam shaft is mounted a comparatively large beveled driving gear 212 which makes one revolution with the cam shaft in each complete cycle of the machine's operations. Movement is imparted to the gear 212 from a beveled pinion 214 secured to a short horizontal shaft 216 which is mounted at the rear of the shaft 16 and above the lower end of said shaft, the shaft 216 carrying on its outer end a clutch member 218. This member is provided with a rim 220 to be engaged for turning the machine over by hand, when desired. Mounted loosely on the shaft 216 is a pulley 222 which is arranged to be driven by a belt and has a clutch portion 224 for engagement with the clutch member 218. Normally the pulley 222 turns on the shaft 216 without effective engagement with the clutch member 218, and in order to render the clutch effective to transmit operative movement to the machine, the pulley is forced backwardly on the shaft by means comprising a bell crank 226 provided with a roll 228 in engagement with a sliding wedge block 230 which bears on a washer 232 on the end of the hub 234 of the pulley. The bell crank 226 is operated by clutch controlling mechanism which is arranged to be actuated by a treadle 236 and causes the machine to perform its cycle of operations in a plurality of successive steps between which the machine is brought automatically to rest. This mechanism is not shown herein fully and in detail since its construction, except in the particulars to be noted, is substantially identical with that shown in United States Letters Patent No. 791,986, granted upon a prior application of R. F. McFeely on June 6, 1905. In general this mechanism comprises a rod 984 which is spring actuated in a direction for operating the bell crank 226 to set the clutch through connections comprising a lever 238 and a link 240 and is moved in the opposite direction positively by the machine to disconnect the clutch, the rod also operating a brake, not shown in the drawings, which co-operates with a portion of the gear wheel 212. Movements of the rod 984 are controlled by the means shown and described in prior Patent No. 791,986, comprising an actuating rod X56 which, in the construction herein shown, is engaged by one end of a lever 242, the opposite end of which is connected by a link 244 to the treadle 236. Depression of the treadle serves to operate the rod X56 to cause the machine to be driven by the clutch, the machine coming automatically to rest upon the completion of a partial revolution of the gear 212 and of the cam shaft 16, and resuming its cycle of operations only in response to another depression of the treadle.

In addition to the mechanism hereinbefore mentioned for operating the grippers, the machine is provided with means under the control of the operator for effecting relative movements of different grippers for the purpose of increasing or relaxing the tension of the upper or of adjusting the upper on the last while the upper is held under tension. For illustrative purposes this supplemental gripper operating means is shown as applied to the side grippers. This means embodies features claimed broadly in a prior application of Eli Brothers and John T. Lancaster, Serial No. 843,865, filed June 8, 1914, upon which Patent No. 1,333,536 was granted on March 9, 1920, and in one aspect this invention provides improvements in the means shown in said earlier application. For the purposes in view, each of the side grippers 6 is arranged to be operated independently of its main operating mechanism through connections separately controlled for each gripper by means of hand levers 246 which are mounted on the pivot rod 138 and project substantially horizontally with their handle portions in mutually adjacent relation, as shown in Fig. 2. For operating the grippers the hub 234 of the pulley 222 carries a gear 248 which is intermediate between, and in continuous engagement with, two gears 250 mounted on shafts 252 which turn in bearings in a portion 254 of the frame of the machine, the shafts 252 carrying on their front ends beveled pinions 256 in engagement with similar pinions 258 on short shafts 260 which carry worms 262. Each of the worms 262 is thus continuously driven from the pulley 222. Each of the opposite side grippers is operated from its worm 262 through connections comprising a bar 264 which is slidably mounted in a guideway formed in a bracket 266 and is connected at one end to the rear end portion of the gripper lever 8. The bar 264 carries a guide member 268 in which is slidably mounted a rack member 270 provided with teeth for engagement with the worm 262. It will be evident by reference to Fig. 12 that when the member 270 is moved downward into engagement with the worm 262 movement will be imparted to the bar 264, the direction of rotation of the worm being such that the bar will be moved toward the right, as viewed in this figure, thus imparting to the lever 8 movement in a direction to increase the tension of the upper. In order to move the lever 8 in the opposite direction the machine is provided with a slide 272 which is connected to the slide 264 by means of an idler pinion 274 the teeth of which engage rack teeth formed respectively on the two slides. Mounted in a guide 276 on the slide 272 is a rack member 278 which is similar to the member 270. It will be evident that then the member 278 engages the worm this member likewise will be moved toward the right, as viewed in Fig. 12, but movement of the slide 272 in this direction will, through the rack and pinion connection, impart a movement in the opposite direction to the bar 264, thus moving the gripper lever 8 in the direction to relax the tension of the upper.

The movement of the rack members 270 and 278 is effected and controlled by means of a cover slide 280, Figs. 9 and 10, this slide being mounted on the holder 266 and having flanges which engage in grooves 282 in the rack members. The slide 280 thus positions these members in such manner as to permit only one of them to engage the worm at a time. The slides 280 are operated by means of the respective hand levers 246 hereinbefore referred to, through connections comprising links 284 and bell cranks 286, the latter having forked projections which engage trunnion blocks on the slides. It will be evident that when one of the hand levers 246 is depressed the corresponding member 270 will be carried into engagement with its respective worm 262, causing the bar 264 to be moved toward the right (Fig. 12), and during this movement of the bar the corresponding slide 272 and its member 278 will be carried in the opposite direction by reason of the pinion and rack connection. It will be understood, moreover, that since the bar 264 receives movement from the lever 8 when the grippers are moved by the main operating mechanism to tension the upper, the two rack members 270 and 278, at the time when the supplemental gripper movements are to be effected, will be positioned substantially midway of the worm 262. If it should be desired to cause a side gripper to move in a direction to relax the tension of the upper, the operator will move the corresponding lever 246 upwardly, thus bringing the member 278 into engagement with the worm while the member 270 is disengaged therefrom, and the slide 272 will then be moved toward the right to cause the bar 264 to move in the opposite direction. In order to maintain the slide 280 in a central position and keep both rack members normally out of engagement with the worm, a spring 288 is mounted back of the slide between the inturned ends of a guide member 290. At each end of the spring 288 is a bearing block 292 arranged to be engaged by a projecting portion 294 on the slide 280. Movement of the slide in either direction thus operates one or the other of the blocks 292 to compress the spring 288, and the spring serves to return the slide to a central position and to hold it there ready to be moved in either direction by means of the connected lever 246.

If supplemental movement is imparted to one of the gripper levers 8 to cause the gripper to increase the tension of the upper through the positively operated connections above described, it is desirable then to lock the gripper against retraction, since otherwise a portion at least of the increased tension would be lost upon disengagement of the member 270 from the worm. For this purpose the machine is provided with a catch 296 having teeth to engage co-operating ratchet teeth 298 formed on the bar 264. The catch 296 is mounted for sliding movement toward and from the bar 264 in a guideway in the bracket 266. A spring 300 tends to force the catch 296 in a direction to cause its teeth to engage the teeth 298 and to render its teeth effective to hold the bar 264 in any position of its movement toward the right (Fig. 12), the teeth 298 and the teeth of the catch being so formed as to permit the bar to move in this direction but to prevent it from moving in the opposite direction.

The position of the catch 296, in or out of engagement with the teeth 298, is determined in part by means of a plate 302 which is mounted on and moves with the member 270 and is arranged to engage underneath a ledge 304 on the catch 296, as shown in Fig. 11. When the members 270 and 278 are in their normal position the plate 302 permits the catch 296 to engage the teeth 298, provided the catch has been released by the main updraw movement of the gripper, as will be hereinafter described, and upon movement of the member 270 into engagement with the worm 262 the catch is left in its operative position ready to hold the bar 264 when the latter has been moved toward the right. If the hand lever 246 is moved in a direction to bring the member 278 into engagement with the worm for moving the bar 264 toward the left, the simultaneous upward movement of the member 270 serves to raise the catch 296 from the teeth 298, thus leaving the bar 264 free to be moved in the required direction.

In order to prevent the catches 296 from opposing any obstruction to the normal return movements of the gripper levers effected by the main updraw cam, the machine is provided with means for holding the catches 296 out of engagement with the teeth 298 until the main upper pulling movement of the side grippers is effected. To this end there is provided for each of the catches 296 a controlling slide 306 connected to the gripper operating cam slide 10 and movable lengthwise under a rearward projection on the head of the catch, as shown in Fig. 11. Normally the slide 306 holds the catch out of engagement with the teeth 298, as shown in the drawings. As the cam slide 10 arrives, however, at the limit of it upper pulling movement, a cutaway portion 308 of the slide 306 arrives under the head of the catch and permits the catch to be forced by the spring 300 into engagement with the teeth 298 subject to the control of the plate 302, as hereinbefore explained. When the cam slide 10 is returned to its starting position, the catches 296 are again lifted out of engagement with the teeth 298 by the action of the slide 306. It will thus be evident that the catches are rendered automatically effective to hold or lock the side grippers against retractive movement from the position that they assume at the end of their first updraw movement effected by the operation of the cam slide 10, as well as to prevent retractive movement of the grippers from any position to which they are moved subsequently for increasing the tension of the upper, and that the catches continue to hold the side grippers positively against yield in the direction of the plane of the shoe bottom throughout the entire overdraw movement of the grippers thus contributing effectively to a tight overdraw.

The mechanism for driving tacks to secure the upper in pulled over position at the sides of the shoe is, in its general features, substantially the same as that shown in prior Patent No. 1,029,387. The driver bars 194 are operated by driver rods 310 which are normally retracted against the pressure of spring operated arms 312 and are released in the usual way to render these arms effective to drive the tacks. The tacks are delivered periodically to the tack carriers 192 through tubes 314 which are curved to cause the tacks to be deposited in the carriers in a substantially horizontal position. Tacks are deposited in these tubes periodically by means of the usual tack separator operated by a hopper 316. The hopper 316 receives oscillatory movement from the cam shaft 16 through connections which, in their general features, are like those shown and described in United States Letters Patent No. 1,107,337, granted upon an application of R. F. McFeely on August 18, 1914. These connections comprise a rack bar 318 operated yieldingly in both directions through a spring 320 from a rod 322 which, in the construction shown, is connected to a bell crank 324 connected in turn by means of a rod 326 to a cam slide 328. Normally the hopper 316 is thus oscillated once in each cycle of operations of the machine, causing the separator to deposit tacks in the tubes 314 and also delivering tacks to the usual raceways.

In the operation of machines of the illustrative type it sometimes happens that after the machine has stopped at the end of its upper pulling movement it becomes necessary, by reason of the manner in which one or more of the grippers may have engaged and pulled the upper, to remove the shoe from the machine and cause the grippers to engage and pull the upper again. In order to permit the removal of the shoe from the machine the grippers are tripped manually, and before the upper pulling operation can be again effected, it is necessary to cause the machine to complete its cycle and return the parts to starting position. In order to prevent the discharge and consequent waste of the tacks in the tack holders, the machine herein shown is provided with means whereby movement of the drivers to force the tacks out of the tack holders, and also movement of the separator to deposit tacks in the conducting tubes, may be temporarily prevented. For this purpose the machine is provided with a slidable plate 330 which is guided on rods 332 and has projecting end portions 334 arranged to engage heads 336 on the driver rods 310. This plate is moved vertically into or out of position to engage the heads 336 through connections to a hand wheel 338, these connections comprising a bell crank 340 projecting at one end through an opening in the plate 330 and connected at its other end by means of a link 342 to a pivoted lever 344 which is rigid with the hand wheel 338. Normally the parts are retained by friction in the position shown in Figs. 1 and 14, leaving the driver rods 310 free to be operated by the spring arms 312. If it is desired to prevent feeding and discharge of tacks during a portion of the cycle of the machine's operations, the hand wheel 338 is turned in a counter-clockwise direction (Fig. 1), thus causing the bell crank 340 to force the plate 33 downward to position the projections 334 in front of the heads 336. At the same time the upper end portion of the lever 344 is moved into position to engage a stop lug 346 on the oscillatory hopper 316. After the parts have been positioned in this manner the treadle 236 may be depressed to cause the machine to complete its cycle of operations with the assurance that the tacks already in the tack carriers 192 will not be discharged since the plate 330 will prevent driving movement of the rods 310. Engagement of the lever 344 with the lug 346, moreover, prevents such movement of the hopper as to cause the separator to be operated, notwithstanding the usual movement of the hopper operating connections against the tension of the spring 320. Before the shoe is again presented in position to be operated upon, the hand wheel 338 will be turned in the opposite direction to position the parts as required for the normal operation of the machine. Features of this tack saving mechanism are claimed broadly in prior United States Letters Patent No. 1,129,881.

In Fig. 15 is shown a novel construction of gripper adapted, in its illustrative use, for engagement with the upper at the side of the last. In practice it has been found advantageous to provide a construction of side grippers in which the jaws are extended lengthwise of the edge of the upper to cause them to engage portions of the upper near the shank. Since the gripper jaws, however, in their normal starting position, engage the upper in a location between the plane of the sole and the top face of the last, it has been found that gripper jaws, extended as above described, may catch upon the edge of the sole in the upper pulling operation, particularly in turn shoe work, in such manner as to upturn the edge of the sole from the last. The present invention provides a construction by which this difficulty is avoided. By reference to Fig. 15 it will be seen that the gripper jaw which is next to the last has a comparatively narrow shank portion 352 whereby it is secured to its holder, the jaw having a portion 350 projecting laterally beyond the shank portion 352 and the holder, and upon the projecting portion 350 is an upstanding lip 354. In the normal upper receiving position of the gripper, illustrated in Fig. 15, the lip 354 extends across the plane of the sole and thus serves as a guide to prevent the gripper from catching on the sole in the upper pulling operation.

In the operation of the machine, constructed as hereinbefore described, the last with an upper and a sole assembled thereon is presented in the position substantially as indicated by dotted lines in Fig. 1, with the sole in engagement with the sole rest 4 and with the margin of the upper materials projecting within the open jaws of the toe and side grippers. The treadle 236 is then depressed, rendering the driving mechanism effective to turn the cam shaft 16 through a part of a revolution, causing the toe and side grippers to close upon and to pull the upper and to come to rest while holding the upper under tension. If it should be observed at this stage that the upper is incorrectly positioned in one or more of the grippers in such manner as to render it necessary to reinsert the upper, the grippers will be tripped manually and after the adjustment of the tack saving device to prevent the feeding and discharge of the tacks, the machine will be caused to complete its cycle of movements by the depression of the treadle. If, however, as is usual, no such reinsertion of the upper is required, the operator will observe the condition of the stock with respect both to the tension to which the various parts of the upper are subjected, and to the adjustment of the upper on the last. If it should be required to shift the opposite side portions of the upper relatively lengthwise of the last in order to position the tip seam in the correct angular relation to the lengthwise dimension of the shoe, this may be effected by the operation of a hand lever 348 through the connections to the side grippers which are common to machines of the illustrative type. If it should be desired to shift the upper transversely of the last or either to increase or to relax the tension of one or both sides of the upper, this may be effected by movement of one or the other, or both, of the hand levers 246 in directions to cause supplemental movements of the respective side grippers in such manner as to adjust or tension the upper at the sides precisely as desired. The tensioning of the toe portion of the upper, moreover, may be varied by the operation of the hand lever 110 in the manner hereinbefore explained.

The machine herein shown is designed to perform its cycle of operations in three stages or steps, of which the upper pulling operation, above described, is the first step. After the upper has been correctly tensioned and adjusted, the operator swings the arm 142, which carries the shoe supporting instrumentalities, in a direction toward the left, as viewed in Fig. 2, until the head of the stop screw 144 engages the side of the frame. He then depresses the treadle 236 a second time, causing the driving mechanism to impart another partial rotation to the cam shaft 16. During this second stage of the cycle, the side grippers and tacking instrumentalities, including the novel side wiper mechanism shown in detail in Fig. 4, are operated to overlay and fasten the upper at the sides of the shoe, and the tacker arms 188 and the parts carried thereby are then returned to their starting position. At the beginning of this stage of the cycle of operations, moreover, the shoe supporting mechanism is moved into engagement with the shoe by the operation of the cam 126, causing the pads 112 to be separated and to stretch the upper at the forepart transversely over the last before the upper has been overlaid and fastened, the shoe support being finally pressed into firm engagement with the shoe by the action of the pawl 172 on the ratchet wheel 168. During this stage the toe grippers remain in holding engagement with the upper.

During the pause subsequent to the second stage of the cycle of operations of the machine above described, and while the shoe is held firmly between the sole rest 4 and the shoe supporting pads 112, the operator lasts the forepart of the upper by manipulation of the toe grippers and the wiper mechanism in a manner which will be fully understood from the explanation hereinbefore given of the construction and use of these particular portions of the machine. The upper may be secured in lasted position in a manner well understood by the application of a binding wire supported upon a reel 356 in a position convenient for use, and since the shoe is supported at the top of the forepart without any obstruction adjacent to the sides of the shoe, it will be evident that freedom of movement for applying the binder is insured. After the toe portion of the upper has been lasted, the treadle 236 is depressed for the third time, and during the third and final stage of the cycle of operations of the machine, whereby the cam shaft 16 is caused to complete its rotation, the shoe supporting mechanism is swung away from the shoe by the action of the cam 126 and permitted to return by gravity to its idle position indicated in Fig. 2 and other portions of the machine also are returned to their starting positions, thus permitting the shoe to be removed and leaving the parts ready to operate upon another shoe.

Having described the invention, what I claim as new and desire to secure by Letters Patent of the United States is:

1. A machine of the class described having, in combination, means for positioning an upper and a last with the top of the forepart of the upper facing the operator and the toe end of the last pointing substantially in a direction of non-intersection with the vertical front plane of the machine, upper pulling instrumentalities arranged to operate upon the shoe in said position and comprising grippers and levers connected to said grippers for moving them rearwardly to pull the upper, an operating shaft extending upward substantially in front of said levers and connected to the levers to operate them, and a substantially horizontal power shaft connected to said operating shaft.

2. A machine of the class described having, in combination, means for positioning an upper and a last with the top of the forepart of the upper facing the operator and the toe end of the last pointing substantially in a direction of non-intersection with the vertical front plane of the machine, upper pulling instrumentalities arranged to operate upon the shoe in said position and comprising grippers and levers connected to said grippers for moving them rearwardly to pull the upper, an operating shaft extending upward substantially in front of said levers and connected to the levers to operate them, a substantially horizontal power shaft connected to said operating shaft, means for driving said power shaft, and means for controlling the operation of said driving means to cause the machine to perform its cycle of operations in a series of steps with a pause between successive steps.

3. A machine of the class described having, in combination, means for positioning an upper and a last with the top of the fore part of the upper facing the operator and the toe end of the last pointing substantially in a direction of non-intersection with the vertical front plane of the machine, upper pulling instrumentalities arranged to operate upon the shoe in said position and comprising grippers and levers connected to said grippers for moving them rearwardly to pull the upper, an operating shaft extending upward substantially in front of said levers and connected to the levers to operate them, a substantially horizontal power shaft connected to said operating shaft, means for driving said power shaft, and means for controlling said driving means from said operating shaft.

4. A machine of the class described having, in combination, means for positioning an upper and a last with the top of the forepart of the upper facing the operator and the toe end of the last pointing substantially in a direction of non-intersection with the vertical front plane of the machine, upper pulling instrumentalities arranged to operate upon the shoe in said position and comprising grippers and levers connected to said grippers for moving them rearwardly to pull the upper, an operating shaft extending upward substantially in front of said levers and connected to the levers to operate them, a power shaft at the rear of said levers, and means connecting said power shaft to said operating shaft.

5. A machine of the class described having, in combination, means for positioning an upper and a last with the top of the forepart of the upper facing the operator and the toe end of the last pointing substantially in a direction of non-intersection with the vertical front plane of the machine, upper pulling instrumentalities arranged to operate upon the shoe in said position and comprising grippers and levers connected to said grippers for moving them rearwardly to pull the upper, an operating shaft extending upward substantially in front of said levers and connected to the levers to operate them, a gear wheel on the lower end portion of said operating shaft, a power shaft, and a gear wheel on said power shaft arranged to drive the gear wheel on said operating shaft.

6. A machine of the class described having, in combination, means for positioning an upper and a last with the top of the forepart of the upper facing the operator and the toe end of the last pointing substantially in a direction of non-intersection with the vertical front plane of the machine, upper pulling instrumentalities arranged to operate upon the shoe in said position and comprising grippers and levers connected to said grippers for moving them rearwardly to pull the upper, an operating shaft extending upward substantially in front of said levers and connected to the levers to operate them, a gear wheel on said operating shaft, a power shaft at the rear of said levers, and a gear wheel on said power shaft arranged to drive the gear wheel on said operating shaft.

7. A machine of the class described having, in combination, means for positioning an upper and a last with the top of the forepart of the upper facing the operator and the toe end of the last pointing substantially in a direction of non-intersection with the vertical front plane of the machine, upper pulling instrumentalities arranged to operate upon the shoe in said position and comprising grippers and levers connected to said grippers for moving them rearwardly to pull the upper, an operating shaft extending upward substantially in front of said levers and connected to the levers to operate them, a gear wheel on the lower end portion of said operating shaft, a substantially horizontal power shaft mounted above the lower end of said operating shaft, and a gear wheel on said power shaft arranged to engage the gear wheel on said operating shaft.

8. A machine of the class described having, in combination, means for positioning an upper and a last with the top of the forepart of the upper facing the operator and the toe end of the last pointing substantially in a direction of nonintersection with the vertical front plane of the machine, upper pulling instrumentalities arranged to operate upon the shoe in said position and comprising grippers and levers connected to the grippers for moving them rearwardly to pull the upper, an operating shaft extending upward substantially in front of said levers and connected to the levers to operate them, a substantially horizontal power shaft mounted above the lower end of said operating shaft and at the rear of said levers, and means connecting said power shaft to said operating shaft.

9. A machine of the class described having, in combination, means for positioning an upper and a last with the top of the forepart of the upper facing the operator and the toe end of the last pointing substantially in a direction of non-intersection with the vertical front plane of the machine, upper pulling instrumentalities arranged to operate upon the shoe in said position, and mechanism for operating said instrumentalities comprising an operating shaft inclined to a horizontal plane, and a substantially horizontal power shaft connected to said operating shaft.

10. A machine of the class described having, in combination, means for positioning an upper and a last with the top of the forepart of the upper facing the operator and the toe end of the last pointing substantially in a direction of non-intersection with the vertical front plane of the machine, upper pulling instrumentalities arranged to operate upon the shoe in said position, and mechanism for operating said instrumentalities comprising an operating shaft inclined to a horizontal plane, a substantially horizontal power shaft, and bevel gearing connecting said power shaft to said operating shaft.

11. A machine of the class described having, in combination, means for positioning an upper and a last with the top of the forepart of the upper facing the operator and the toe end of the last pointing substantially in a direction of non-intersection with the vertical front plane of the machine, upper pulling instrumentalities arranged to operate upon the shoe in said position, and mechanism for operating said instrumentalities comprising an operating shaft inclined to a horizontal plane, a gear on said operating shaft, a power shaft above the lower end of said operating shaft, and a gear on said power shaft engaging said gear on the operating shaft.

12. A machine of the class described having, in combination, means for positioning an upper and a last with the top of the forepart of the upper facing the operator and the toe end of the last pointing substantially in a direction of non-intersection with the vertical front plane of the machine, upper pulling instrumentalities arranged to operate upon the shoe in said position, and mechanism for operating said instrumentalities comprising an operating shaft inclined upward toward the front of the machine, a power shaft at the rear of the machine above the lower end of said operating shaft, and means connecting said power shaft to said operating shaft.

13. A machine of the class described having, in combination, means for positioning an upper and a last with the top of the forepart of the upper facing the operator and the toe end of the last pointing substantially in a direction of non-intersection with the vertical front plane of the machine, upper pulling instrumentalities arranged to operate upon the shoe in said position, and mechanism for operating said instrumentalities comprising an operating shaft inclined upward toward the front of the machine, a substantially horizontal power shaft at the rear of the machine, and means connecting said power shaft to the lower end portion of said operating shaft.

14. A machine of the class described having, in combination, means for positioning an upper and a last with the top of the forepart of the upper facing the operator and the toe end of the last pointing substantially in a direction of non-intersection with the vertical front plane of the machine, upper pulling instrumentalities arranged to operate upon the shoe in said position, and mechanism for operating said instrumentalities comprising an operating shaft inclined upward toward the front of the machine, a gear wheel on the lower end portion of said operating shaft, a substantially horizontal power shaft at the rear of the machine, and a gear wheel on said power shaft engaging the gear wheel on said operating shaft.

15. A machine of the class described having, in combination, means for positioning an upper and a last with the top of the forepart of the upper facing the operator and the toe end of the last pointing substantially in a direction of non-intersection with the vertical front plane of the machine, upper pulling instrumentalities arranged to operate upon the shoe in said position, and mechanism for operating said instrumentalities comprising an operating shaft inclined to a horizontal plane, a substantially horizontal power shaft geared to said operating shaft, a clutch on said power shaft, and means for controlling said clutch from said operating shaft.

16. A machine of the class described having, in combination, a supporting frame, means for positioning an upper and a last substantially at the front of said frame with the top of the forepart of the upper facing the operator and the toe end of the last pointing substantially in a direction of non-intersection with the vertical front plane of the machine, upper pulling means arranged to operate upon the shoe in said position, and mechanism for operating said upper pulling means comprising an operating shaft extending upward substantially at the rear of the shoe, a substantially horizontal power shaft at the rear of said operating shaft, and means connecting said power shaft to said operating shaft.

17. A machine of the class described having, in combination, a supporting frame, means for positioning an upper and a last substantially at the front of said frame with the top of the forepart of the upper facing the operator and the toe end of the last pointing substantially in a direction of non-intersection with the vertical front plane of the machine, upper pulling means arranged to operate upon the shoe in said position, and mechanism for operating said upper pulling means comprising an operating shaft extending upward substantially at the rear of the shoe, a power shaft at the rear of the machine above the lower end of said operating shaft, and means connecting said power shaft to said operating shaft.

18. A machine of the class described having, in combination, a supporting frame, means for positioning an upper and a last substantially at the front of said frame with the top of the forepart of the upper facing the operator and the toe end of the last pointing substantially in a direction of non-intersection with the vertical front plane of the machine, upper pulling means arranged to operate upon the shoe in said position, and mechanism for operating said upper pulling means comprising an operating shaft inclined upward toward the front of the machine substantially at the rear of the shoe, a substantially horizontal power shaft at the rear of the machine above the lower end of said operating shaft, and gearing connecting said power shaft to said operating shaft.

19. A machine of the class described having, in combination, a supporting frame, means for positioning an upper and a last substantially at the front of said frame with the top of the forepart of the upper facing the operator and the toe end of the last pointing substantially in a direction of non-intersection with the vertical front plane of the machine, upper pulling means arranged to operate upon the shoe in said position, and mechanism for operating said upper pulling means comprising an operating shaft at the rear of the shoe inclined upward toward the front of the machine in a vertical plane, and a substantially horizontal power shaft mounted at the rear of the machine in said vertical plane and connected to said operating shaft.

20. A machine of the class described having, in combination, a supporting frame, means for positioning an upper and a last substantially at the front of said frame with the top of the forepart of the upper facing the operator and the toe end of the last pointing substantially in a direction of non-intersection with the vertical front plane of the machine, upper pulling means arranged to operate upon the shoe in said position, and mechanism for operating said upper pulling means comprising an operating shaft inclined upward toward the front of the machine substantially at the rear of the shoe, and means for driving said operating shaft.

21. A machine of the class described having, in combination, a supporting frame, means for positioning an upper and a last substantially at the front of said frame with the top of the forepart of the upper facing the operator and the toe end of the last pointing substantially in a direction of non-intersection with the vertical front plane of the machine, upper pulling means arranged to operate upon the shoe in said position, and mechanism for operating said upper pulling means comprising an operating shaft inclined upward toward the front of the machine substantially at the rear of the shoe, a substantially horizontal power shaft connected to said operating shaft, means for driving said power shaft, and means for controlling said driving means from said operating shaft.

22. A machine of the class described having, in combination, means for positioning an upper and a last with the top of the forepart of the upper facing the operator and the toe end of the last pointing substantially in a direction of non-intersection with the vertical front plane of the machine, upper pulling instrumentalities arranged to operate upon the shoe in said position, an operating shaft extending in angular relation to a horizontal plane for operating said instrumentalities, a power shaft extending in angular relation to said operating shaft, and gearing connecting said power shaft to said operating shaft.

23. A machine of the class described having, in combination, means for positioning an upper and a last with the top of the forepart of the upper facing the operator and the toe end of the last pointing substantially in a direction of non-intersection with the vertical front plane of the machine, upper pulling and fastening instrumentalities arranged to operate upon the shoe in said position, a cam shaft extending in angular relation to a horizontal plane for operating said instrumentalities, a substantially horizontal power shaft connected to said cam shaft, a clutch on said power shaft, and means for controlling said clutch.

24. A machine of the class described having, in combination, means for positioning an upper and a last with the top of the forepart of the upper facing the operator and the toe end of the last pointing substantially in a direction of non-intersection with the vertical front plane of the machine, upper pulling and fastening instrumentalities arranged to operate upon the shoe in said position, a cam shaft inclined to a horizontal plane for operating said instrumentalities, and a substantially horizontal power shaft geared to said cam shaft for operating said cam shaft.

25. A machine of the class described having, in combination, means for positioning an upper and a last with the top of the forepart of the upper facing the operator and the toe end of the last pointing substantially in a direction of non-intersection with the vertical front plane of the machine, upper pulling and fastening instrumentalities arranged to operate upon the shoe in said position, a cam shaft inclined to a horizontal plane for operating said instrumentalities, a substantially horizontal power shaft, bevel gearing connecting said cam shaft and power shaft, a clutch on the power shaft, and means for controlling said clutch.

26. A machine of the class described having, in combination, means for positioning an upper and a last, upper pulling instrumentalities, and mechanism for operating said instrumentalities comprising an operating shaft inclined to the horizontal, a substantially horizontal power shaft, and gearing connecting said power shaft to said operating shaft.

27. A machine of the class described having, in combination, means for positioning an upper and a last, upper pulling instrumentalities, and mechanism for operating said instrumentalities comprising an operating shaft inclined to the horizontal, a substantially horizontal power shaft, above the lower end of said operating shaft, and gearing connecting said power shaft to said operating shaft.

28. A machine of the class described having, in combination, means for positioning an upper and a last, upper pulling instrumentalities, and mechanism for operating said instrumentalities comprising an operating shaft inclined to the horizontal, a substantially horizontal power shaft connected to said operating shaft, a clutch on said power shaft, and means for controlling said clutch from said operating shaft.

29. A machine of the class described, having, in combination, means for positioning an upper and a last, upper pulling and fastening instrumentalities, a cam shaft extending in angular relation to a horizontal plane for operating said instrumentalities, a substantially horizontal power shaft, gearing connecting said cam shaft and power shaft comprising a comparatively large gear on the cam shaft and a comparatively small gear on the power shaft, and means for controlling the operation of the power shaft to cause the machine to perform its cycle of operations through one revolution of the cam shaft effected in a series of successive steps between which the machine comes to rest.

30. A machine of the class described having, in combination, means for positioning an upper and a last, upper pulling and fastening instrumentalities, a cam shaft inclined to a horizontal plane for operating said instrumentalities, a substantially horizontal power shaft, bevel gearing connecting said cam shaft and power shaft comprising a comparatively large gear on the cam shaft and a comparatively small gear on the power shaft, a clutch on the power shaft, and means for controlling said clutch.

31. A machine of the class described having, in combination, a supporting frame, means for positioning an upper and a last substantially at the front of said frame with the toe end of the last pointing upward, upper pulling means, and mechanism for operating said upper pulling means comprising an operating shaft extending upward substantially at the rear of the shoe, a substantially horizontal power shaft, and means connecting said power shaft to said operating shaft.

32. A machine of the class described having, in combination, a supporting frame, means for positioning an upper and a last substantially at the front of said frame with the toe end of the last pointing upward, upper pulling means, and mechanism for operating said upper pulling means comprising an operating shaft extending upward at the rear of the shoe in a substantially vertical plane, a power shaft located substantially in said vertical plane, and means connecting said power shaft to said operating shaft.

33. A machine of the class described having, in combination, a supporting frame, means for positioning an upper and a last substantially at the front of said frame with the toe end of the last pointing upward, upper pulling means, and mechanism for operating said upper pulling means comprising an operating shaft inclined upward toward the front of the machine substantially at the rear of the shoe, a substantially horizontal power shaft at the rear of said operating shaft and above the lower end of said operating shaft, and means connecting said power shaft to said operating shaft.

34. A machine of the class described having, in combination, a supporting frame, means for positioning an upper and a last substantially at the front of said frame with the toe end of the last pointing upward, upper pulling means, and mechanism for operating said upper pulling means comprising an operating shaft inclined upward toward the front of the machine substantially at the rear of the shoe, a power shaft at the rear of said operating shaft, and gearing connecting said power shaft to said operating shaft.

35. A machine of the class described having, in combination, a supporting frame, means for positioning an upper and a last substantially at the front of said frame with the toe end of the last pointing upward, upper pulling means, and mechanism for operating said upper pulling means comprising an operating shaft inclined upward toward the front of the machine substantially at the rear of the shoe, a substantially horizontal power shaft at the rear of said operating shaft and in a plane with the operating shaft, and gearing connecting said power shaft to said operating shaft.

36. A machine of the class described having, in combination, a supporting frame, means for positioning an upper and a last substantially at the front of said frame with the toe end of the last pointing upward, upper pulling means comprising a gripper and a lever connected to said gripper, and means for operating said lever comprising an operating shaft extending upward in a position substantially between the shoe and said lever, a substantially horizontal power shaft at the rear of the machine above the lower end of said operating shaft, and means connecting said power shaft to said operating shaft.

37. A machine of the class described having, in combination, a supporting frame, means for positioning an upper and a last substantially at the front of said frame with the toe end of the last pointing upward, upper pulling means comprising a gripper and a lever connected to said gripper, and means for operating said lever comprising an operating shaft inclined upward toward the front of the machine in a position substantially between the shoe and said lever, a substantially horizontal power shaft at the rear of the machine substantially in a plane with said operating shaft and above the lower end of said operating shaft, and gearing connecting said power shaft to said operating shaft.

38. A machine of the class described having, in combination, means for positioning an upper and a last with the toe end of the last pointing upward in a substantially vertical direction, upper pulling means, and mechanism for operating said upper pulling means comprising an operating shaft extending upward at the rear of the shoe, a power shaft extending in angular relation to said operating shaft, and means connecting said power shaft to said operating shaft.

39. A machine of the class described having, in combination, means for positioning an upper and a last with the toe end of the last pointing upward in a substantially vertical direction, upper pulling means, and mechanism for operating said upper pulling means comprising an operating shaft inclined to the vertical, a substantially horizontal power shaft, and means connecting said power shaft to said operating shaft.

40. A machine of the class described having, in combination, means for positioning an upper and a last with the toe end of the last pointing upward in a substantially vertical direction, upper pulling means, and mechanism for operating said upper pulling means, comprising an operating shaft inclined to the vertical and positioned substantially at the rear of the shoe, a power shaft extending in angular relation to said operating shaft, and gearing connecting said power shaft to said operating shaft.

41. A machine of the class described having, in combination, means for positioning an upper and a last with the toe end of the last pointing upward in a substantially vertical direction, upper pulling means, and mechanism for operating said upper pulling means comprising a cam shaft extending upward at the rear of the shoe, and means for driving said cam shaft.

42. A machine of the class described having, in combination, means for positioning an upper and a last with the toe end of the last pointing upward in a substantially vertical direction, upper pulling means comprising a gripper and a lever extending upward in a substantially vertical direction and connected to said gripper, and mechanism for operating said lever comprising an operating shaft extending upward substantially between said lever and the shoe, a substantially horizontal power shaft, and means connecting said power shaft to said operating shaft.

43. In a machine of the class described, the combination with an upper engaging gripper, of means for imparting operative movement to said gripper comprising driving mechanism, two driven members, means connecting one of said driven members to the gripper, and means connecting the driven members to each other to cause them to move simultaneously in opposite directions, said driven members being arranged to permit one or the other to be moved alternatively into operative relation to the driving mechanism to cause the gripper to be moved either in a direction to tension the upper or in a direction to relax the tension.

44. In a machine of the class described, the combination with an upper engaging gripper, of means for imparting operative movement to said gripper comprising driving mechanism, two driven members, means connecting one of said driven members to the gripper, means connecting the driven members to each other to cause them to move simultaneously in opposite directions, and controlling means connected to both said members for moving one or the other of them alternatively into operative relation to the driving mechanism to cause the gripper to be moved either in a direction to tension the upper or in a direction to relax the tension.

45. In a machine of the class described, the combination with an upper engaging gripper, of means for imparting operative movement to said gripper comprising a rotatable worm, two driven members, means connecting one of said driven members to the the gripper, means connecting the driven members to each other to cause them to move simultaneously in opposite directions, and controlling means for effecting operative connection between said worm and the different driven members alternatively to cause the gripper to be moved either in a direction to tension the upper or in a direction to relax the tension.

46. In a machine of the class described, the combination with an upper engaging gripper, of means for imparting operative movement to said gripper comprising driving mechanism, driven members operatively connected to the gripper to cause the gripper to be moved in opposite directions by movements of the different respective members in the same direction, and means for moving either of said members alternatively into operative relation to the driving mechanism.

47. In a machine of the class described, the combination with an upper engaging gripper, of means for imparting operative movement to said gripper comprising a rotatable worm, driven members operatively connected to the gripper to cause the gripper to be moved in opposite directions by movements of the different respective members in the same direction, and means for effecting operative connection between the worm and said different members alternatively.

48. In a machine of the class described, the combination with an upper engaging gripper, of means for imparting operative movement to said gripper comprising a rotatable worm, slides movable lengthwise of said worm, means connecting said slides to each other to cause them to move simultaneously in opposite directions, means connecting one of the slides to the gripper, and means for effecting operative connection between the worm and said different slides alternatively.

49. In a machine of the class described, the combination with an upper engaging gripper, of means for imparting operative movement to said gripper comprising a rotatable worm, rack members operatively connected to the gripper to cause the gripper to be moved in opposite directions by movements of the different respective rack members in the same direction, and controlling means connected to said rack members for moving the different members alternatively into engagement with the worm.

50. In a machine of the class described, the combination with an upper engaging gripper, of means for imparting operative movement to said gripper comprising a rotatable worm, slides movable lengthwise of said worm, means connecting said slides to each other to cause them to move simultaneously in opposite directions, means connecting one of the slides to the gripper, racks carried by said slides and movable transversely of the slides into and out of engagement with said worm, and controlling means for moving the different racks alternatively into engagement with the worm.

51. In a machine of the class described, the combination with an upper engaging gripper, of means for imparting operative movement to said gripper comprising a rotatable worm, slides movable lengthwise of said worm and provided with rack teeth, a pinion engaging the teeth on said slides to cause the slides to move simultaneously in opposite directions, means connecting one of said slides to the gripper, rack members carried by the slides for engagement with said worm, and controlling means for effecting operative engagement between the worm and the different rack members alternatively.

52. In a machine of the class described, the combination with an upper engaging gripper, of a gripper operating lever, a bar connected to said lever, a rotatable worm, and a member on said bar movable into and out of engagement with said worm.

53. In a machine of the class described, the combination with an upper engaging gripper, of a rotatable worm, a bar connected to said gripper and extending lengthwise of said worm, and a rack member mounted on said bar and movable transversely of the bar into and out of engagement with the worm.

54. In a machine of the class described, the combination with a gripper, of a power driven worm, and means for effecting operative connection between said worm and gripper at the will of the operator for imparting movement to the gripper.

55. In a machine of the class described, the combination with a gripper, of a rotatable worm, a bar connected to said gripper and extending lengthwise of said worm, and means for effecting operative connection between said bar and worm at the will of the operator.

56. In a machine of the class described, the combination with an upper engaging gripper, of means for operating said gripper to cause it to pull an upper and hold it under tension, a power driven worm, and means for effecting operative connection between said worm and the gripper for imparting a supplemental movement to the gripper.

57. In a machine of the class described, the combination with an upper engaging gripper, of means for operating said gripper to cause it to pull an upper and hold it under tension, a power driven worm, and means for effecting operative connection between said worm and the gripper for imparting to the gripper movement either to increase or to relax the tension of the upper at the will of the operator.

58. In a machine of the class described, the combination with an upper engaging gripper, of a lever connected to said gripper, means for operating said lever to impart upper pulling movement to the gripper, a bar connected to said lever, a power driven worm, and means for effecting operative connection between said bar and worm at the will of the operator for imparting a supplemental movement to the gripper.

59. In a machine of the class described, the combination with grippers for engaging an upper at opposite sides of a last, of means for operating said grippers to cause them to pull the upper and hold it under tension, a power driven worm for each of said grippers, and means under the control of the operator for effecting operative connection between either of said grippers and its worm to cause the gripper to receive additional movement either to increase or to relax the tension of the upper.

60. In a machine of the class described, the combination with an upper engaging gripper, of means for imparting operative movement to said gripper comprising a rotatable worm, driven members operatively connected to the gripper to cause the gripper to be moved in opposite directions by movements of the different respective members in the same direction, controlling means for effecting operative connection between the worm and said different members alternatively, and yielding means tending to hold said controlling means in a position in which the worm is disconnected from said members.

61. In a machine of the class described, the combination with an upper engaging gripper, of means for imparting operative movement to said gripper comprising a rotatable worm, rack members operatively connected to the gripper to cause the gripper to be moved in opposite directions by movements of the different respective rack members in the same direction, controlling means comprising a slide connected to said rack members for moving the different members alternatively into engagement with the worm, and spring means tending to hold said slide in a position in which said members are disconnected from the worm.

62. In a machine of the class described, the combination with an upper engaging gripper, of means for imparting an upper pulling movement to said gripper, ratchet mechanism for locking the gripper against retractive movement, and means arranged to receive operative movement in said upper pulling movement of the gripper for rendering said ratchet mechanism effective to hold the gripper.

63. In a machine of the class described, the combination with an upper engaging gripper, of a cam shaft and connections between said shaft and the gripper for operating the gripper, and mechanism controlled by said gripper operating connections for locking the gripper against retractive movement and for subsequently unlocking it to permit its return to starting position.

64. In a machine of the class described, the combination with an upper engaging gripper, of a cam operated member for imparting upper pulling movement to said gripper, a device for locking the gripper against retractive movement, and mechanism operated by said member for controlling said locking device.

65. In a machine of the class described, the combination with an upper engaging gripper, of means comprising a cam slide for imparting an upper pulling movement to said gripper, means for imparting an additional movement to the gripper while said cam slide is at rest, means for locking the gripper against retraction from the position attained in said additional movement, means for operating said cam slide subsequently to return the gripper to starting position, and means operated by said cam slide for causing said locking means to release the gripper.

66. In a machine of the class described, the combination with an upper engaging gripper, of means comprising a cam slide for imparting an upper pulling movement to said gripper, means for imparting an additional movement to the gripper while said cam slide is at rest, means for locking the gripper against retraction from the position attained in said additional movement, and means operated by said cam slide for controlling said locking means to render it either effective or ineffective to hold the gripper.

67. In a machine of the class described, the combination with an upper engaging gripper, of means for imparting an upper pulling movement to said gripper, a bar connected to the gripper, means operative through said bar to impart an additional movement to the gripper, and a member for engaging said bar to lock the gripper against retraction from the position attained in said additional movement.

68. In a machine of the class described, the combination with an upper engaging gripper, of gripper operating means comprising a lengthwise movable bar, ratchet teeth on said bar, a catch for engaging said teeth to hold the gripper in any position to which it is moved by said operating means, and means arranged to be operated by a moving part of the machine to render said catch either effective or ineffective to hold the gripper.

69. In a machine of the class described, the combination with an upper engaging gripper, of a gripper operating lever, means for operating said lever to cause the gripper to pull an upper, a bar connected to said lever, teeth on said bar, and a catch for engaging said teeth to hold the gripper against retractive movement.

70. In a machine of the class described, the combination with an upper engaging gripper, of means for operating said gripper, a bar movable with the gripper, a member for engaging said bar to lock the gripper against retractive movement, and automatic means for controlling said locking member to render it either effective or ineffective to hold the gripper.

71. In a machine of the class described, the combination with an upper engaging gripper, of means for operating said gripper to pull an upper, a bar connected to said gripper and having ratchet teeth thereon, means for operating said bar to impart a supplemental movement to the gripper, a catch for engaging said teeth to hold the gripper against retraction from the position attained in said supplemental movement, and means connected to said gripper operating means for normally holding the catch out of engagement with said teeth and for releasing it to permit it to engage the teeth when said means is operated.

72. In a machine of the class described, the combination with an upper engaging gripper, of gripper operating means comprising a driving member, driven members movable alternatively into engagement with said driving member to cause the gripper to be moved respectively in opposite directions, controlling means normally positioned to cause both said driven members to be disengaged from the driving member, means operative in said normal position of the controlling means for locking the gripper against movement in one direction, and means operative by movement of said controlling means in one direction to cause said locking means to release the gripper.

73. In a machine of the class described, the combination with an upper engaging gripper, of gripper operating means comprising a rotatable worm, members arranged for alternative engagement with said worm to cause the gripper to be moved respectively in opposite directions, controlling means movable in opposite directions to cause one or the other of said members to engage the worm, means for locking the gripper against movement in one direction, and means operated by movement of said controlling means in one direction for operating said locking means to release the gripper.

74. In a machine of the class described, the combination with an upper engaging gripper, of gripper operating means comprising a rotatable worm, a pair of rack members arranged for alternative engagement with said worm to cause the gripper to be moved respectively in opposite directions, a catch for locking said gripper against movement in one direction, and means on one of said rack members for operating said catch to release the gripper.

75. A machine of the class described having, in combination, means for positioning an upper and a last with the top of the forepart of the upper facing the operator and the toe end of the last pointing substantially in a direction of non-intersection with the vertical front plane of the machine, grippers for engaging the upper on the last, means for operating said grippers to pull the upper, and power operated means under the control of the operator in his working position for imparting to a gripper a supplemental movement to change the tension of the upper.

76. A machine of the class described having, in combination, means for positioning an upper and a last with the top of the forepart of the upper facing the operator and the toe end of the last pointing substantially in a direction of non-intersection with the vertical front plane of the machine, grippers for engaging the upper at opposite sides and at the toe of the last, means for operating said grippers to cause them to pull the upper and to hold it under tension, and power operated means under the control of the operator in his working position for imparting to one or both of said side grippers additional movement either in a direction to increase the tension of the upper or in a direction to relax the tension.

77. A machine of the class described having, in combination, means for positioning an upper and a last with the top of the forepart of the upper facing the operator and the toe end of the last pointing substantially in a direction of non-intersection with the vertical front plane of the machine, grippers for engaging the upper on the last, means for operating said grippers to cause them to pull the upper and hold it under tension, and power operated means under the control of the operator in his working position for effecting relative movement of different grippers to adjust the upper on the last.

78. In a machine of the class described, the combination with shoe positioning means, of a shoe support comprising members spaced from each other for engaging the upper respectively at opposite sides of the longitudinal median line of the shoe, said support being movable to carry said members from an idle position substantially at one side of the shoe to a position opposite to the top of the forepart and thence into supporting engagement with the shoe.

79. In a machine of the class described, the combination with shoe positioning means, of a shoe support for engaging the upper at opposite sides of the longitudinal bottom, and independent spring means for controlling said yielding movement of the wiper.

124. In a machine of the class described, the combination with upper pulling means, of a wiper support, a wiper mounted on said support for movement inwardly over the margin of the shoe bottom in substantially the same location lengthwise of the edge of the shoe bottom as the upper pulling means and also for movement away from the plane of said margin, and independent yielding means for controlling said different movements of the wiper.

125. In a machine of the class described, the combination with an upper pulling gripper, of a wiper support, a wiper on said support arranged to engage a portion of the upper in the line of pull of the gripper, spring means connected to said wiper and tending to hold it with its front end projected from the support in the direction of the shoe, and other spring means tending to rock the wiper relatively to the support in a direction to depress its front end portion with respect to the bottom of the shoe.

126. In a machine of the class described, the combination with upper pulling means, of a wiper support, a wiper slidingly mounted on said support, spring means connected to said wiper to position it with its front end projected from the support in the direction of the shoe, and a spring plunger arranged to engage the wiper to rock it in a direction to depress its front end with respect to the shoe bottom while permitting relative sliding movement between the wiper and said support.

127. In a machine of the class described, the combination with upper pulling means, of overlaying and fastening instrumentalities comprising a tacker arm movable toward and from the shoe, a wiper mounted on said arm for laying the upper over the margin of the shoe bottom, said wiper being mounted for movement relatively to the arm in the overwiping plane and also for rocking movement in a plane transverse to the plane of the shoe bottom, and independent yielding means for controlling said different movements of the wiper.

128. In a machine of the class described, the combination with shoe positioning means and means for working the upper of the shoe over its last, of tacking mechanism movable toward the shoe to tack driving position, said mechanism being constructed to drive a plurality of tacks in different locations along the edge of the shoe bottom, and means for engaging the side of the shoe to cause said mechanism to be positioned in accordance with the lateral contour of the shoe, said side engaging means being adjustable about an axis extending in transverse relation to the plane of the shoe bottom to determine the distances from the edge of the shoe at which the different tacks shall be driven.

129. In a machine of the class described, the combination with shoe positioning means and means for working the upper of the shoe over its last, of tacking mechanism movable toward the shoe to tack driving position, said mechanism being constructed to drive a plurality of tacks in different locations along the edge of the shoe bottom, and a member for engaging the side of the shoe to cause said mechanism to be positioned in accordance with the lateral contour of the shoe, said member being angularly adjustable to determine the distances from the edge of the shoe at which the different tacks shall be driven.

130. In a machine of the class described, the combination with shoe positioning means and means for working the upper of the shoe over its last, of a side tacker arm movable toward and from the shoe, tacking means mounted on said arm for self-adjustment in accordance with the lateral contour of the shoe, and means secured to said tacking means for engagement with the side of the shoe to determine said adjustment, said shoe engaging means being adjustable relatively to the tacking means in a plane transverse to the axis of self-adjusting movement of the tacking means.

131. In a machine of the class described, the combination with means for working an upper over a last, of a plurality of tack drivers, means for operating said drivers, and means movable at the will of the operator into position to engage the several drivers and prevent their tack driving movement.

132. In a machine of the class described, the combination with means for working an upper over a last, of a plurality of tack drivers, a plate having means for engaging the several drivers to prevent their operative movement, and means for moving said plate into and out of driver engaging position.

133. In a machine of the class described, the combination with means for working an upper over a last, of a plurality of tack drivers, means for operating said drivers, a plate positioned in a plane transverse to the direction of movement of the drivers and having means for engagement with the drivers to prevent their operative movement, means for guiding said plate, and manual means for moving the plate into and out of driver engaging position.

134. In a machine of the class described, the combination with means for working an upper over a last, of upper fastening means comprising a plurality of tack driver rods having heads thereon, means for operating said rods, and means movable transversely of the rods into and out of position for engagement with the several heads to prevent driving movement of the rods.

135. In a machine of the class described, the combination with means for working an upper over a last, of a plurality of tack drivers, means for operating said drivers, a member movable into position to engage said drivers and prevent their operative movement, a bell crank having one arm connected to said member, a manually operative controlling member, and means connecting said controlling member to the other arm of the bell crank.

136. In a machine of the class described, the combination with means for working an upper over a last, of a plurality of tack drivers, means for operating said drivers, means for supplying tacks to said drivers, means movable into position to engage the several drivers and prevent their operative movement, a manually operative controlling member connected to said driver engaging means, and means operated by said controlling member for interrupting the delivery of tacks to the drivers.

137. In a machine of the class described, the combination with means for working an upper over a last, of a plurality of tack drivers, means for operating said drivers, means comprising a rotatable member for supplying tacks to the drivers, a member movable into position for engagement with the several drivers to prevent their operative movement, manual means for operating said driver engaging member, and means movable by said manual means into position to stop the rotation of said tack supplying member.

138. In a machine of the class described, the combination with means for positioning a last upon which an upper and a sole are assembled, of a gripper for engaging the upper at the side of the last in a location between the plane of the sole and the top face of the last, and means for moving the last and the gripper relatively to cause the upper to be pulled by the gripper, said gripper having a portion laterally extended therefrom to increase the extent of engagement of the gripper with the upper and a lip on said extended portion arranged to project across the plane of the sole when the gripper is in its initial upper receiving position.

139. In a machine of the class described, an upper engaging gripper comprising a holder and co-operating jaws mounted on said holder, said jaws being extended beyond the holder in a direction lengthwise of the edge of the upper, and a lip on the extended portion of one of said jaws for guiding the gripper to prevent it from catching on the edge of the sole in the upper pulling operation.

140. In a machine of the class described, an upper engaging gripper comprising a holder and co-operating jaws mounted on said holder, one of said jaws having a shank portion whereby the jaw is secured to the holder and an upper engaging portion projecting beyond said shank portion in a direction lengthwise of the edge of the upper, said projecting portion of the jaw having an extension thereon for guiding the gripper to prevent it from catching on the edge of the sole in the upper pulling operation.

141. In a machine of the class described, the combination with an upper engaging gripper, of gripper operating means comprising a pair of slides connected to move in substantially opposite directions simultaneously, means connecting one of said slides to the gripper, driving mechanism, and means for effecting operative connection between said driving mechanism and the different slides alternatively.

142. In a machine of the class described, the combination with an upper engaging gripper, of mechanism for operating said gripper first to pull the upper and then to overdraw the upper, power driven means under control of the operator for imparting a supplemental movement to the gripper after its pulling movement and prior to the overdraw, and ratchet mechanism for locking the gripper against retractive movement from the position assumed in said supplemental movement and for holding it locked throughout the overdrawing operation.

143. In a machine of the class described, the combination with an upper engaging gripper, of means for operating said gripper to pull the upper, means comprising a catch for locking said gripper against retractive movement, and mechanism connected to said gripper operating means for normally holding said catch in an inoperative position and for releasing it to render it operative as the gripper receives its operative movement.

144. In a machine of the class described, the combination with an upper engaging gripper, of power driving means comprising a rotative driving member, connections to the gripper through which it may be operated by said member either to pull the upper or to relax the tension, controlling means normally positioned to render said member inoperative to move the gripper and movable in opposite directions to cause the gripper to be moved in the different directions alternatively, means operative in said normal position of the controlling means for locking the gripper against movement in one direction, and means arranged to be operated by the controlling means to cause said locking means to release the gripper when the gripper is to be moved in said direction.

145. In a machine of the class described, the combination with shoe positioning the combination with shoe positioning means, of a device for engaging the upper of the shoe at the top of the forepart, a support upon which said upper engaging device is mounted, means for moving said support toward the shoe, and mechanism operated by said movement of the support for moving said device relatively to the support in the direction of the shoe.

104. In a machine of the class described, the combination with shoe positioning means, of a device for engaging the upper of the shoe, a support upon which said upper engaging device is mounted, means for moving said support toward the shoe, mechanism on said support for moving said device relatively to the support in the direction of the shoe, and relatively stationary means for engaging said mechanism to operate it as the support moves toward the shoe.

105. In a machine of the class described, the combination with shoe positioning means, of a device for engaging the upper of the shoe, a support upon which said upper engaging device is movably mounted, means for moving said support toward the shoe, a ratchet wheel carried by the support and connected to said upper engaging device for moving it relatively to the support, a pawl for operating said wheel, and means for operating said pawl as the support is moved toward the shoe.

106. In a machine of the class described, the combination with shoe positioning means, of a device for engaging the upper of the shoe at the top of the forepart, a support upon which said upper engaging device is movably mounted, means for moving said support toward the shoe, yielding means tending to move said upper engaging device relatively to the support in the direction of the shoe while permitting the support to move relatively to said device upon engagement of the device with the shoe, and mechanism operated by movement of the support toward the shoe for locking said support and device against such relative movement.

107. In a machine of the class described, the combination with shoe positioning means, of a device for engaging the upper of the shoe, a support upon which said upper engaging device is movably mounted, means for moving said support toward the shoe, and mechanism operated by said movement of the support for locking said support and upper engaging device together.

108. In a machine of the class described, the combination with shoe positioning means, of a device for engaging the upper of the shoe, a support upon which said upper engaging device is movably mounted, means for moving said support toward the shoe, a ratchet wheel carried by the support and connected to said upper engaging device, a pawl, and mechanism operated by movement of the support toward the shoe for causing said pawl to engage the ratchet wheel.

109. In a machine of the class described, the combination with shoe positioning means, of a device for engaging the upper of the shoe, a support upon which said upper engaging device is mounted, the connection between said support and device being constructed to permit relative yielding movement of said parts upon engagement of said device with the shoe, and mechanism operated by relative movement of said support and shoe for locking the support and upper engaging device against such relative yielding movement and for moving said device relatively to the support to position it firmly in engagement with the shoe.

110. In a machine of the class described, the combination with means for positioning a last and an upper, of presser members relatively movable in engagement with the upper to stretch it over the last, supporting means for said members, and means for operating said supporting means first yieldingly and then positively to move it in the direction of the shoe.

111. In a machine of the class described, the combination with means for positioning a last and an upper, of presser members relatively movable in engagement with the upper to stretch it over the last, a holder upon which said members are mounted, a support for said holder, means for moving said support toward the shoe, and means for moving said holder relatively to the support in the direction of the shoe to increase the pressure of said members on the shoe.

112. In a machine of the class described, the combination with means for positioning a last and an upper, of presser members relatively movable in engagement with the upper to stretch it over the last, supporting means for said members, means for moving said supporting means yieldingly toward the shoe, and mechanism for holding said supporting means positively with said members in engagement with the shoe.

113. In a machine of the class described, the combination with shoe positioning means, of shoe upper engaging means, a support for said upper engaging means, means for moving said support toward the shoe, and mechanism for moving said upper engaging means relatively to the support in the direction of the shoe, said mechanism being adjustable to vary the extent of said movement of the upper engaging means.

114. In a machine of the class described, the combination with shoe positioning means, of a device for engaging the top of the forepart of the shoe upper, a support for said upper engaging device, means for moving said support toward the shoe, and mechanism automatically operative in the movement of the support toward the shoe for moving said upper engaging device relatively to the support in the direction of the shoe, said mechaninsm being adjustable to vary the extent of said movement for shoes of different sizes.

115. In a machine of the class described, the combination with shoe positioning means, of shoe upper engaging means, a support for said upper engaging means, means for moving said support toward the shoe, and mechanism comprising a relatively stationary stop operative in said movement of the support to cause said upper engaging means to move relatively to the support in the direction of the shoe, said stop being adjustable to vary the extent of said relative movement of the upper engaging means.

116. In a machine of the class described, the combination with shoe positioning means, of shoe upper engaging means, a support upon which said upper engaging means is movably mounted, yielding means tending to move said upper engaging means relatively to said support in the direction of the shoe while permitting the support to move relatively to the upper engaging means upon engagement of said means with the shoe, and means operated by the movement of said support toward the shoe for locking said support and upper engaging means against such relative movement, said locking means being adjustable to vary the time of its operation.

117. In a machine of the class described, the combination with an upper engaging gripper, of means for operating said gripper to cause it to pull an upper and hold it under tension, said operating means comprising a sectional lever, and manual means for effecting relative movement of different sections of said lever to vary the tension of the upper.

118. In a machine of the class described, the combination with an upper engaging gripper, of means for operating said gripper to cause it to pull an upper and hold it under tension, said operating means comprising a lever different portions of which are relatively movable against yielding resistance in the upper pulling operation, and a connection between the different portions of the lever for effecting relative movement of said portions to vary the tension of the upper.

119. In a machine of the class described, the combination with an upper engaging gripper, of means for operating said gripper to cause it to pull an upper and hold it under tension, said operating means comprising a lever different portions of which are relatively movable against yielding resistance in the upper pulling operation, and manually operative means mounted on one portion of the lever and connected to the other portion for effecting relative movement of said different portions to vary the tension of the upper.

120. In a machine of the class described, the combination with an upper engaging gripper, of means for operating said gripper to cause it to pull an upper and hold it under tension, said operating means comprising a sectional lever, a hand lever pivotally mounted on one section of said operating lever, and a connection between said hand lever and the other section of the operating lever for effecting relative movement of said sections to vary the tension of the upper.

121. In a machine of the class described, the combination with upper pulling means, of a wiper for laying over the margin of the shoe bottom a portion of the upper materials which has been acted upon by the upper pulling means, a support for said wiper movable toward and from the shoe, yielding means for positioning the wiper relatively to the support while permitting the support to move relatively to the wiper in the direction of the shoe upon engagement of the wiper with the upper, the wiper being mounted also for movement in a direction transverse to the plane of the shoe bottom, and independent yielding means for controlling said last named movement of the wiper.

122. In a machine of the class described, the combination with upper pulling means, of a wiper arranged to engage a tensioned portion of the upper held by the upper pulling means and to wipe said portion of the upper inwardly after it has been released by the pulling means, a support for said wiper movable toward and from the shoe, a spring tending to hold the wiper projected from said support in the direction of the shoe while permitting the support to move relatively to the wiper in the direction of the shoe upon engagement of the wiper with the upper, the wiper being mounted also for yielding movement in a direction transverse to the plane of the shoe bottom, and a second spring for controlling said yielding movement of the wiper.

123. In a machine of the class described, the combination with upper pulling means, of a wiper for engaging the upper while held by the upper pulling means and for wiping it over the margin of the shoe bottom upon its release by the pulling means, a support for said wiper movable toward and from the shoe, a spring tensionable in the direction of the movement of said support and connected to the wiper to force it forwardly toward the shoe, the wiper being mounted also for yielding movement in a direction transverse to the plane of the shoe means, of a shoe support for engaging the upper at the top of the forepart of the shoe, said support being movable into and out of operative position about an axis extending laterally of the shoe and positioned at the rear of the heel end of the shoe.

146. In a machine of the class described, the combination with shoe positioning means, of a shoe support comprising a lever pivoted to swing into and out of operative position about an axis extending laterally of the shoe, and means on said lever constructed to engage the upper of the shoe at the top of the forepart and to stretch the upper laterally outward toward the opposite sides of the shoe.

147. In a machine of the class described, the combination with shoe positioning means, of a shoe support comprising a lever mounted to swing about an axis extending laterally of the shoe and having means for engaging the upper at the top of the forepart, said lever being constructed to permit its upper engaging means to be moved laterally of the shoe into such position as to afford the operator an unobstructed view of the top of the forepart.

148. In a machine of the class described, the combination with shoe positioning means, of a shoe support comprising a lever mounted to swing about an axis extending laterally of the shoe and having means for engaging the upper at the top of the forepart, said lever comprising two portions pivotally connected to permit said upper engaging means to be swung laterally of the shoe into such position as to afford the operator an unobstructed view of the top of the forepart.

149. In a machine of the class described, the combination with shoe positioning means, of a shoe support comprising a two-part lever mounted to swing about an axis extending laterally of the shoe, one part of the lever being pivoted to the other part for swinging movement also laterally of the shoe and having thereon presser members constructed and arranged to be forced apart by pressure against the shoe to stretch the upper laterally.

150. In a machine of the class described, the combination with shoe positioning means, of a shoe support comprising a lever mounted to swing about an axis extending laterally of the shoe substantially at the rear of the heel end of the shoe and having thereon means for engaging the upper at the top of the forepart, positive means for imparting operative movement to said lever, and mechanism constructed and arranged to permit a relative yielding movement of predetermined extent between said upper engaging means and the lever.

151. In a machine of the class described, the combination with shoe positioning means, of a shoe support pivoted to swing about an axis extending laterally of the shoe substantially at the rear of the heel end of the shoe and comprising a lever having thereon means for engaging the upper at the top of the forepart, means for imparting operative movement to said lever, means constructed and arranged to permit a relative yielding movement between said upper engaging means and the lever, and means for locking the parts against such relative yield when the shoe support is in operative position.

152. In a machine of the class described, the combination with means for positioning a shoe with its toe pointing upwardly in a substantially vertical direction, of a shoe support comprising an arm arranged to extend upwardly in front of the shoe and having means for engaging the upper at the top of the forepart, said arm being movable laterally of the shoe into such position as to afford the operator an unobstructed view of the top of the forepart.

153. In a machine of the class described, the combination with means for positioning a shoe with its toe end pointing upwardly in a substantially vertical direction, of a shoe support comprising an arm arranged to extend upwardly in front of the shoe and having means for engaging the upper at the top of the forepart, said arm being mounted to swing laterally of the shoe toward and from an idle position substantially at one side of the shoe, and means for swinging said arm also backwardly into shoe supporting position.

154. In a machine of the class described, the combination with upper pulling means, of overlaying means comprising a support movable laterally of the edge of the shoe bottom and an overlaying member on said support arranged to engage the upper in a location where the upper is stressed by the pulling means, said member being mounted for movement relatively to the support in directions along the plane of the shoe bottom and in directions transverse to said plane, and independent yielding means for controlling movements of the member in said different directions.

155. In a machine of the class described, the combination with shoe positioning means, of a wiper support, a wiper on said support for wiping the margin of the upper of the shoe inwardly over the bottom of the last, said support having a guideway in which the wiper is mounted for sliding movement substantially in the overwiping plane and for tipping movement transversely of said plane to permit the wiper to yield in different directions in response to resistance of the shoe materials, and spring devices operative independently of each other for controlling respectively the yield of the wiper in said different directions.

156. In a machine of the class described, the combination with shoe positioning means, of a wiper support, a wiper on said support for wiping the margin of the upper of the shoe inwardly over the bottom of the last, said wiper being mounted for sliding movement along the support substantially in the overwiping plane and for tipping movement transversely of said plane to permit the wiper to yield in different directions in response to resistance of the shoe materials, spring means for controlling the yield of the wiper in the overwiping plane, and independently operative spring means having sliding engagement with the wiper and arranged to control the tipping of the wiper.

In testimony whereof I have signed my name to this specification.

E. MARK SULLIVAN,
*Administrator of Ronald F. McFeely, deceased.*

Certificate of Correction.

It is hereby certified that in Letters Patent No. 1,409,190, granted March 14, 1922, upon the application of Ronald F. McFeely, deceased, late of Beverly, Massachusetts, by E. Mark Sullivan, administrator, of Boston, Massachusetts, for an improvement in "Machines for Shaping Uppers to Lasts," errors appear in the printed specification requiring correction as follows: Page 7, line 88, for the word "then" read *when;* page 20, line 115, claim 101, strike out the words "advancing said member and" and insert the same to follow the word "for" in line 116; page 23, line 38, claim 126, after the word "support" and before the period insert the words *and plunger;* and that the said Letters Patent should be read with these corrections therein that the same may conform to the record of the case in the Patent Office.

Signed and sealed this 10th day of October, A. D., 1922.

[SEAL.]                                                 WM. A. KINNAN,

*Assistant Commissioner of Patents.*

Certificate of Correction.

It is hereby certified that in Letters Patent No. 1,409,190, granted March 14, 1922, upon the application of Ronald F. McFeely, deceased, late of Beverly, Massachusetts, by E. Mark Sullivan, administrator, of Boston, Massachusetts, for an improvement in "Machines for Shaping Uppers to Lasts," errors appear in the printed specification requiring correction as follows: Page 7, line 88, for the word "then" read *when;* page 20, line 115, claim 101, strike out the words "advancing said member and" and insert the same to follow the word "for" in line 116; page 23, line 38, claim 126, after the word "support" and before the period insert the words *and plunger;* and that the said Letters Patent should be read with these corrections therein that the same may conform to the record of the case in the Patent Office.

Signed and sealed this 10th day of October, A. D., 1922.

[SEAL.]                                            WM. A. KINNAN,
*Assistant Commissioner of Patents.*